US007289038B2

(12) United States Patent
Watanabe et al.

(10) Patent No.: US 7,289,038 B2
(45) Date of Patent: Oct. 30, 2007

(54) UNDERWATER SOUND RADIATION APPARATUS

(75) Inventors: Takayuki Watanabe, Hamamatsu (JP); Shinji Kishinaga, Hamamatsu (JP)

(73) Assignee: Yamaha Corporation, Shizuoka-ken (JP)

( * ) Notice: Subject to any disclaimer, the term of this patent is extended or adjusted under 35 U.S.C. 154(b) by 347 days.

(21) Appl. No.: 10/191,296

(22) Filed: Jul. 10, 2002

(65) Prior Publication Data

US 2003/0053375 A1 Mar. 20, 2003

(30) Foreign Application Priority Data

Jul. 13, 2001 (JP) ............................. 2001-214367
Apr. 19, 2002 (JP) ............................. 2002-118260

(51) Int. Cl.
*H04B 13/02* (2006.01)

(52) U.S. Cl. ................ 340/850; 340/854.1; 340/856.4; 367/189; 367/176

(58) Field of Classification Search ................ 340/850, 340/851, 854.1, 854.3, 855.6, 856.4; 367/131-134, 367/141-176, 189
See application file for complete search history.

(56) References Cited

U.S. PATENT DOCUMENTS 4,058,075 A * 11/1977 Piper, Sr. .................... 114/222
4,435,794 A * 3/1984 Marshall et al. ............ 367/155
4,628,490 A * 12/1986 Kramer et al. ................. 367/1
4,839,871 A * 6/1989 Massey ...................... 367/132
5,136,547 A * 8/1992 Laukien ......................... 367/1
5,142,505 A 8/1992 Peynaud
5,143,001 A 9/1992 Eriksson
5,271,106 A * 12/1993 McClish et al. ............ 434/254
5,355,351 A * 10/1994 Yoshikawa et al. ......... 367/156
5,532,980 A 7/1996 Zarate et al.
5,546,469 A 8/1996 Donahoe
6,467,103 B1 * 10/2002 Gardenier et al. ........... 4/541.1

FOREIGN PATENT DOCUMENTS

DE 4241312 12/1992
JP 63-100990 10/1985
JP 04-089015 7/1990
JP 06-061768 8/1992
JP 06-221009 1/1993

(Continued)

OTHER PUBLICATIONS

European Search Report dated Jul. 29, 2004.

(Continued)

*Primary Examiner*—Benjamin C. Lee
*Assistant Examiner*—Daniel Previl
(74) *Attorney, Agent, or Firm*—Reed Smith LLP; Stanley P. Fisher, Esq.; Juan Carlos A. Marquez, Esq.

(57) ABSTRACT

A plurality of actuators are provided at predetermined intervals on the reverse surface of a predetermined side wall of a swimming pool. When an electric signal corresponding to a sound to be propagated in the water is given to the actuators, the electric signal is converted by the actuators into a mechanical vibration signal to cause vibrations. The actuators are secured directly to the reverse surface of the predetermined side wall by an adhesive or otherwise, and thus the vibrations of the actuators are radiated as a sound in the water of the pool through the side wall.

15 Claims, 25 Drawing Sheets

FOREIGN PATENT DOCUMENTS

| | | | |
|---|---|---|---|
| JP | 08238285 | * | 3/1995 |
| JP | 10-243491 | | 2/1997 |
| JP | 2000-92578 | | 9/1998 |
| JP | 2001-129245 | | 11/1999 |
| JP | 2001-157642 | | 12/1999 |
| JP | 2002-118260 | | 10/2000 |
| WO | WO98/27923 | | 3/1997 |
| WO | WO98/27923 | * | 2/1998 |

OTHER PUBLICATIONS

Notice for Reason for Refusal dated Feb. 20, 2007 in Japanese with English translation.

* cited by examiner

UNDERWATER SOUND RADIATION APPARATUS

BACKGROUND OF THE INVENTION

The present invention relates generally to underwater sound radiation apparatus for radiating sounds or acoustic energy in water of lakes, rivers, swimming pools, etc. The present invention also relates to underwater sound radiation apparatus for provision on water tanks and ships.

In swimming pools and other facilities that are used for training of synchronized swimming, underwater ballet, etc., there have been used underwater speakers to radiate background music sounds in water or give various instructions to persons performing in the water.

FIGS. 32 and 33 are views showing an exemplary manner in which conventional underwater speakers are installed in a swimming pool. As a tone signal of background music is given to two underwater speakers disposed in the water at two adjacent corners of the swimming pool shown in FIGS. 32 and 33, each of the underwater speakers audibly generates or reproduces a sound corresponding to the given tone signal, which is propagated through the water to a person performing in the water. In the water, the external ears of the person are shut up by the water, so that the hearing by the ear drums is lost; however, the hearing can be acquired through the so-called bone conduction by which sound is led directly to the internal ears by way of the skull. Namely, the person performing in the water can hear the sound from the speakers through the bone conduction.

However, as will be detailed below, it is very difficult for the above-mentioned conventional underwater speakers to reproduce sounds of wide frequency bands (particularly, sounds of low frequency bands), and sounds output from these underwater speakers tend to greatly differ in frequency characteristics.

Further, to install the conventional underwater speakers in the swimming pool, extra means have to be provided for hanging the speakers, e.g. in a case where the swimming pool is a provisional facility) as illustrated in FIG. 33, or dedicated boxes, protective members, etc. (not shown) have to be provided for installing the underwater speakers in predetermined positions e.g. in a case where the swimming pool is a permanently fixed facility. In addition, the installed positions of the conventional underwater speakers have to be determined taking the directional characteristics of the speakers into account. Furthermore, only limited types of the underwater speakers can be used due to the special nature of their specifications, which would inevitably lead to increased cost.

SUMMARY OF THE INVENTION

In view of the foregoing, it is an object of the present invention to provide an underwater sound radiation apparatus which can reproduce sounds of wide frequency bands in the water.

To accomplish the above-mentioned object, the present invention provides an improved underwater sound radiation apparatus for radiating a sound in water, which comprises: a vibratable wall forming a boundary surface that contacts the water; a plurality of vibrating sections that are provided on a same surface of the wall and convert an input electric signal into a mechanical vibration signal to vibrate the wall; and a vibration control section that supplies each of the vibrating sections with an electric signal corresponding to a sound to be radiated in the water.

In the invention thus arranged, the plurality of vibrating sections, provided on the same surface of the vibratable wall, vibrate the wall upon receipt of an electric signal corresponding to a sound to be radiated in the water, to thereby radiate the sound in the water. Where the present invention is applied to a water tank, ship or the like including a vibratable wall, the plurality of vibrating sections directly vibrate the vibratable wall itself; therefore, the overall vibrating surface area of the wall thus vibrated is much greater than that of the diaphragms of underwater speakers employed in the conventionally-known technique. As a consequence, the present invention can appropriately reproduce sounds of over wide frequency bands (particularly, sounds of low frequency bands) in the water. Further, with the arrangement that the vibrating sections are provided on the vibratable wall, the wall can vibrate as a single unit, so that there would occur no sound reflection off the wall involving unwanted phase inversion. As a result, the present invention can clearly reproduce sounds under water without canceling sounds of low frequencies.

The present invention also provides an underwater sound radiation apparatus for provision on a water tank (swimming pool) having a plurality of walls to radiate a sound in water stored in the water tank, which comprises: a plurality of vibrating sections that are provided on a particular one of the walls and convert an input electric signal into a mechanical vibration signal to vibrate the particular one wall; and a vibration control section that supplies each of the vibrating sections with an electric signal corresponding to a sound to be radiated in the water.

In the invention thus arranged, the plurality of vibrating sections, provided on at least one of a plurality of walls constituting the water tank (swimming pool), vibrates the at least one wall upon receipt of an electric signal corresponding to a sound to be radiated in the water, to thereby radiate the sound in the water. It is generally known in the art that low-frequency sounds of long wavelengths can be reproduced appropriately by increasing the vibrating surface area of the speakers (as will be detailed later in connection with detailed description of the present invention). In the present invention, however, the plurality of vibrating sections directly vibrate the at least one wall itself; therefore, the overall vibrating surface area of the wall thus vibrated is much greater than that of the diaphragms of underwater speakers or the like employed in the conventionally-known technique. As a consequence, the present invention can appropriately reproduce sounds of wide frequency bands (particularly, sounds of low frequency bands) in the water. Further, with the arrangement that the vibrating sections are provided on the vibratable wall of the water tank (swimming pool), the wall can vibrate as a single unit, so that there would occur no sound reflection off the wall involving unwanted phase inversion. As a result, the present invention arranged as above can also clearly reproduce sounds under water without canceling sounds of low frequencies.

The present invention also provides an underwater sound radiation apparatus for provision on a ship to radiate a sound from the ship into water outside of the ship, which comprises: a vibrating section that is provided on a bottom portion of the ship and converts an input electric signal into a mechanical vibration signal to vibrate the bottom portion; and a vibration control section that supplies the vibrating section with an electric signal corresponding to a sound to be radiated in the water.

In the invention thus arranged, the plurality of vibrating sections, provided on the ship bottom portion, vibrate the wall of the ship bottom portion, to thereby radiate the sound in the water. Although it is generally known in the art that low-frequency sounds of long wavelengths can be reproduced appropriately by increasing the vibrating surface area of the speakers (as will be detailed later), the present invention causes the plurality of vibrating sections to directly vibrate the wall of the ship bottom portion itself; therefore, the overall vibrating surface area of the wall thus vibrated is much greater than that of the diaphragms of underwater speakers or the like employed in the conventionally-known technique. As a consequence, the present invention can appropriately reproduce sounds of wide frequency bands (particularly, sounds of low frequency bands) in the water.

BRIEF DESCRIPTION OF THE DRAWINGS

For better understanding of the object and other features of the present invention, its preferred embodiments will be described hereinbelow in greater detail with reference to the accompanying drawings, in which:

FIG. 32 is a schematic plan view showing an exemplary conventional manner in which underwater speakers are installed in a swimming pool or the like.

DETAILED DESCRIPTION OF THE PREFERRED EMBODIMENTS

The following will describe the present invention in relation to embodiments where the basic principles of the present invention are applied to a swimming pool to be used for synchronized swimming or the like. However, it should be appreciated that the present invention is not limited to the described embodiments and various modifications of the invention are also possible without departing from the basic principles. The scope of the present invention is therefore to be determined solely by the appended claims.

A. Primary Embodiment:

<Construction of Swimming Pool 1>

Figure 1:
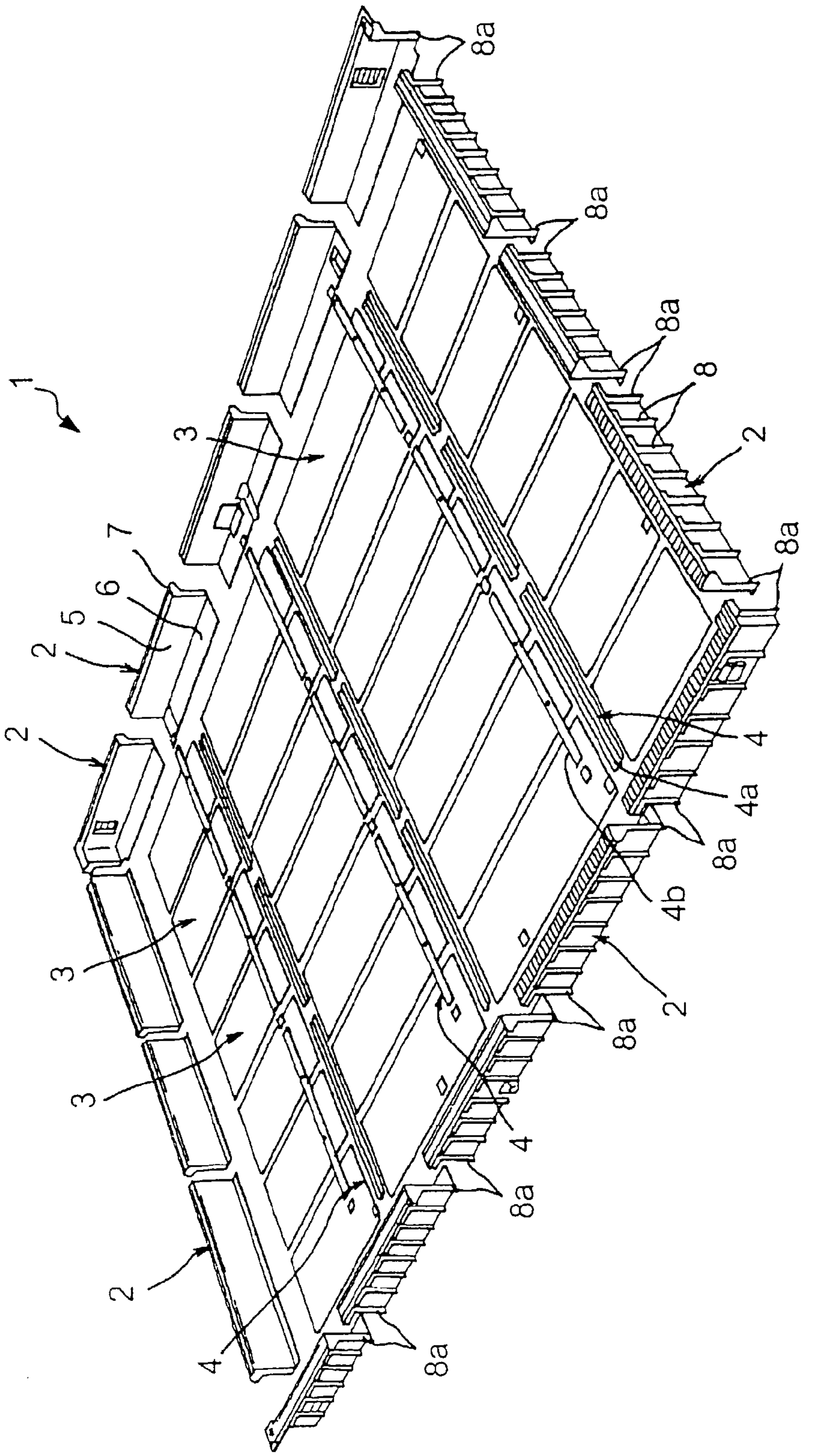
FIG. 1 is an exploded perspective view of a swimming pool to which is applied an embodiment of the present invention.
Figure 2:
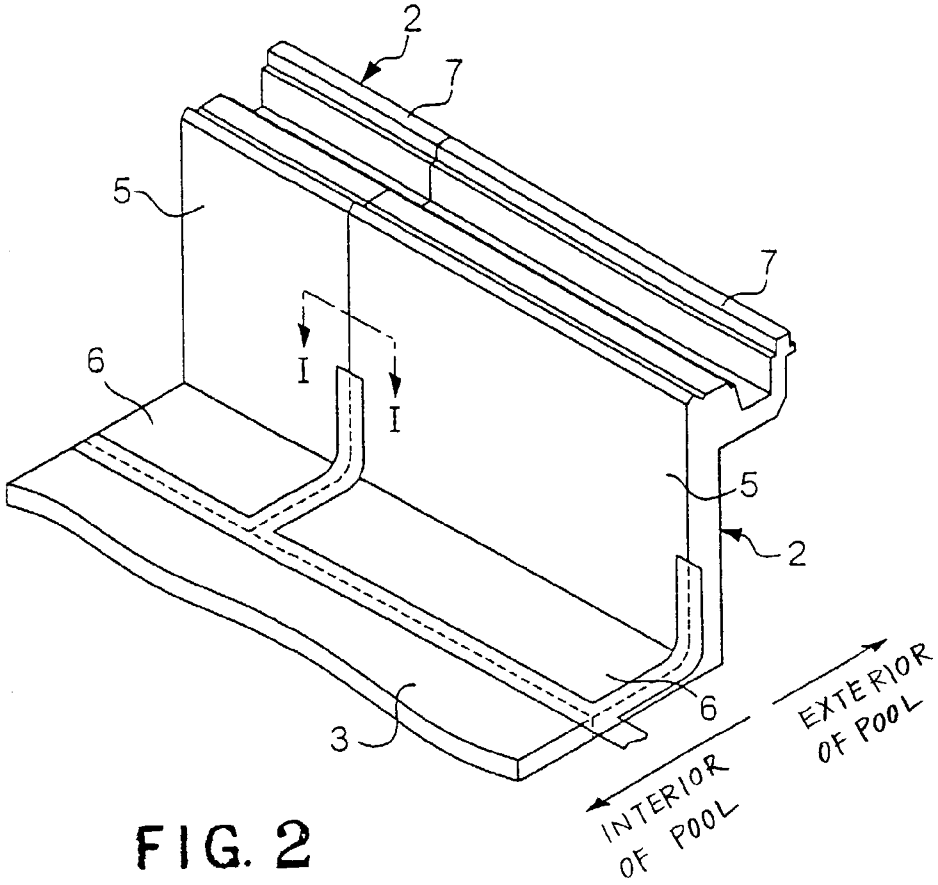
FIG. 2 is a perspective view showing a portion of the swimming pool where a side wall unit and floor unit of the pool are coupled with each other.
Figure 3:
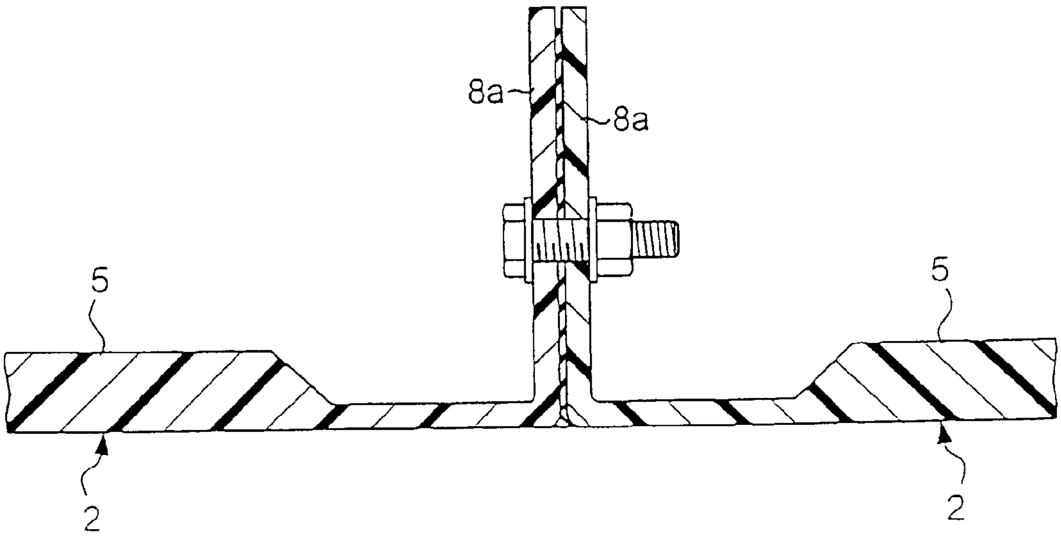
FIG. 3 is a sectional view taken along the I—I line of FIG. 2.

FIG. 1 is an exploded perspective view of a swimming pool 1 to which is applied a primary embodiment of the present invention, and FIG. 2 is a perspective view showing a portion of the swimming pool 1 where side wall and floor units 2 and 3 of the pool 1 are coupled with each other. Further, FIG. 3 is a sectional view taken along the I—I line of FIG. 2.

The pool 1, which is a provisional pool installed temporarily, for example, for a swimming championship tournament, comprises the side wall units 2, floor units 3, gutter units 4, etc. that are formed of an FRP (Fiberglass Reinforced Plastic) material. In the instant embodiment, wall members of the pool 1, forming boundary surfaces that contact the water in the pool 1, are arranged to function as vibrating plates for radiating sounds or acoustic energy in the water; thus, it is preferable that the above-mentioned units and the like of the pool 1 be made of a lightest possible material yet having sufficient rigidity. The preferable material may be other than the FRP material, such as stainless steel, aluminum or copper. The wall members, made of such a lightweight and rigid material, can vibrate as thin plates.

Each of the side wall units 2, as illustratively shown in FIGS. 1 and 2, is an integral or one-piece unit that comprises a vertical wall member 5, a bottom wall member 6 extending substantially horizontally from the lower end edge of the vertical wall member 5 inwardly of the pool 1, and a coping member 7 extending from the upper end edge of the vertical wall member 5 outwardly of the pool 1. As seen from FIG. 1, each of the side wall units 2 further includes a number of vertical flanges 8 projecting outwardly of the pool 1. Further, as shown in FIGS. 1 and 3, the vertical wall member 5 in each of the side wall units 2 has connecting flanges 8*a* at its horizontal opposite ends.

Each of the floor units 3, as shown in FIG. 1, is in the form of a rectangular plate as viewed in plan, and a multiplicity of such floor units 3 are laid in tight contact with one another within an interior space defined by the side wall units 2 assembled into a rectangular frame. The gutter units 4 are intended to direct the water in the pool 1 to a drainage apparatus (not shown). As seen in FIG. 1, each of the gutter units 4 includes upwardly-opening gutters 4*a* each having a channel-like sectional shape, and a slit-formed cover 4*b* covering the gutters 4*a*.

In the instant embodiment, the swimming pool 1 is assembled by joining together, by means of coupling members like rivets or bolts, the above-mentioned units 2 to 4 each formed of the FRP material. The construction of the pool 1 itself is not directly pertinent to the present invention and hence will not be detailed any further. Examples of pools assembled by joining a plurality of FRP-made units (hereinafter also called "FRP pools") as set forth above are detailed, for example, in Japanese Patent Laid-open Publication No.2001-98781.

<Construction of Underwater Sound Radiation Apparatus 100>

Figure 4:
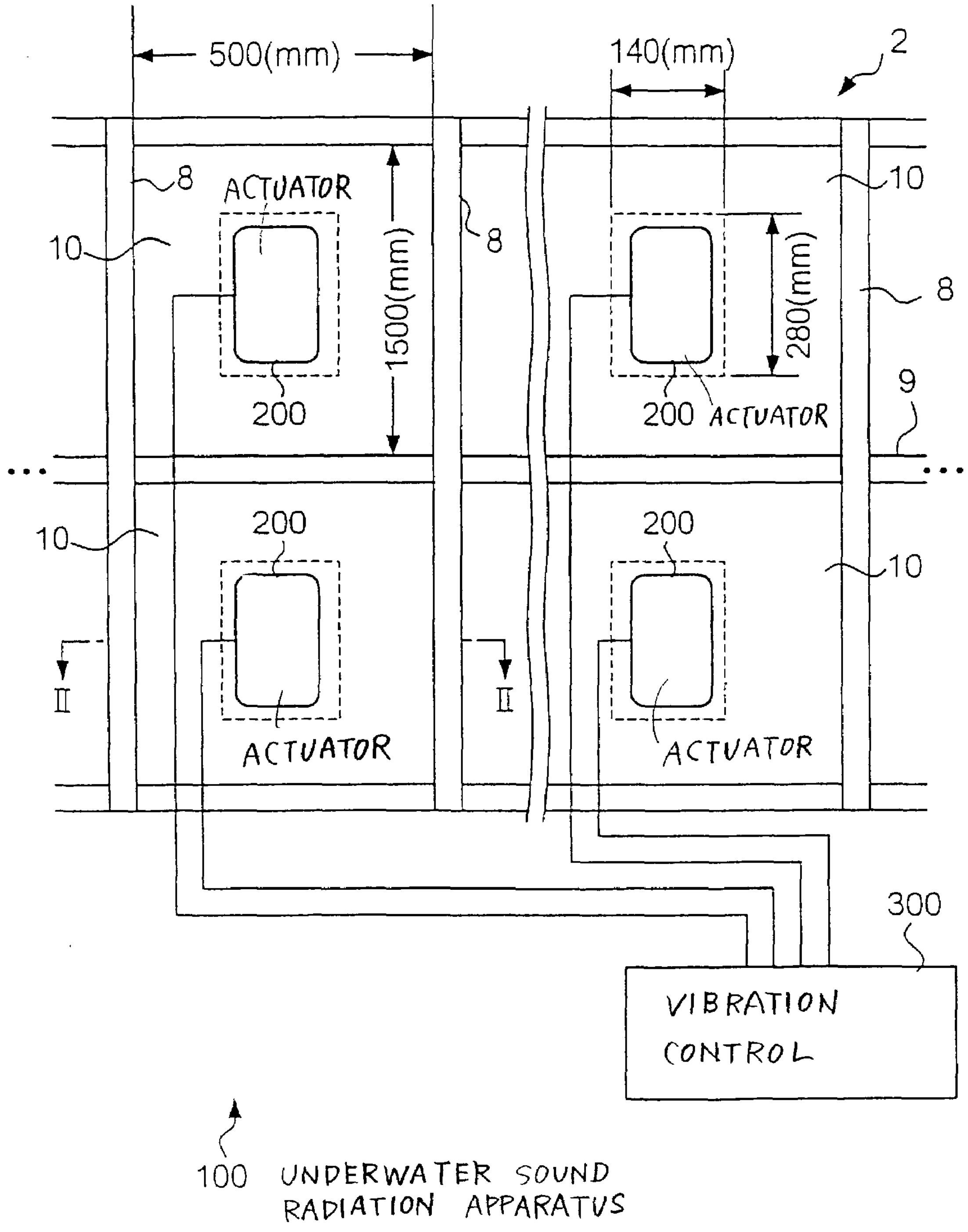
FIG. 4 is a schematic diagram explanatory of an underwater sound radiation apparatus in accordance with the embodiment of the present invention.
Figure 5:
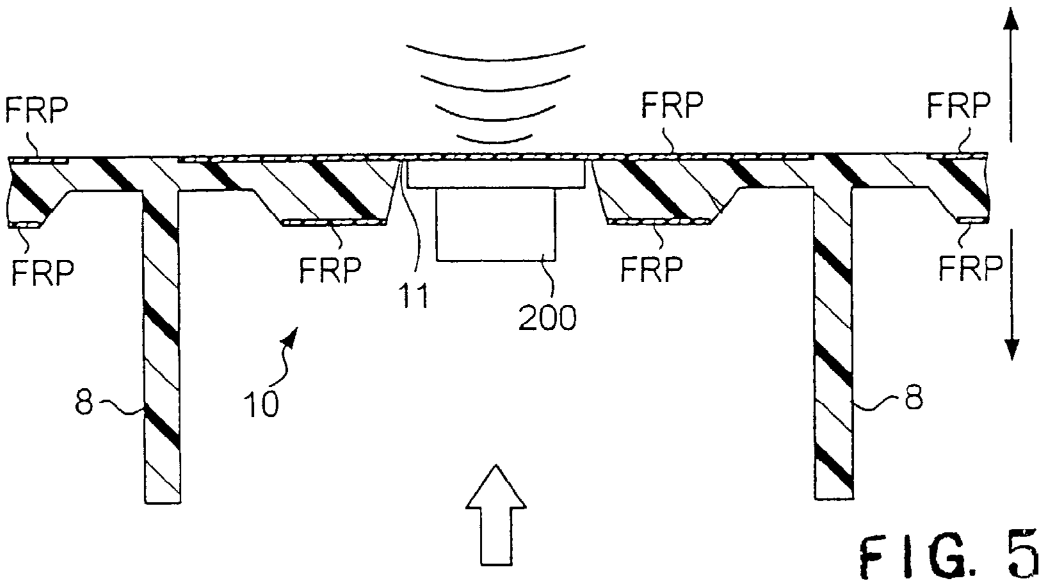
FIG. 5 is a sectional view of the side wall unit taken along the II—II line of FIG. 4.

FIG. 4 is a schematic diagram explanatory of an underwater sound radiation apparatus 100 in accordance with the embodiment of the present invention; specifically, FIG. 4 shows one of the side wall units 2 as viewed from the outside of the swimming pool 1 (see FIG. 2). FIG. 5 is a sectional view of the side wall unit 2 taken along the II—II line of FIG. 4.

As illustrated in FIG. 4, the underwater sound radiation apparatus 100 of the present invention includes a plurality of actuators 200 secured directly to the reverse, i.e. outer, surface of each of the side wall units 2 and functioning as vibration sources, and a vibration control device 300 for supplying the actuators 200 with an electric signal corresponding to a sound to be generated.

Each of the actuators 200 is disposed substantially at the center of one of a plurality of reverse surface units 10 that are each formed by the above-mentioned vertical flanges 8 provided at uniform intervals on the reverse (outer) surface of the side wall units 2 and horizontal plate-shaped members 9 expending at right angles to the flanges 8. As an example, each of the reverse surface units 10 has a 500 mm width and 1,500 mm height. As illustrated in FIG. 5, each of the reverse surface units 10, formed of FRP and acrylic foam materials or the like, has an actuator-mounting recessed portion 11 formed substantially at the center thereof by recessing the acrylic foam material or the like. The actuator 200 is fixedly fitted in the recessed portion 11 by being tightly secured directly to the recessed portion 11 by an adhesive or the like.

<Construction of Actuator 200>

Figure 6:
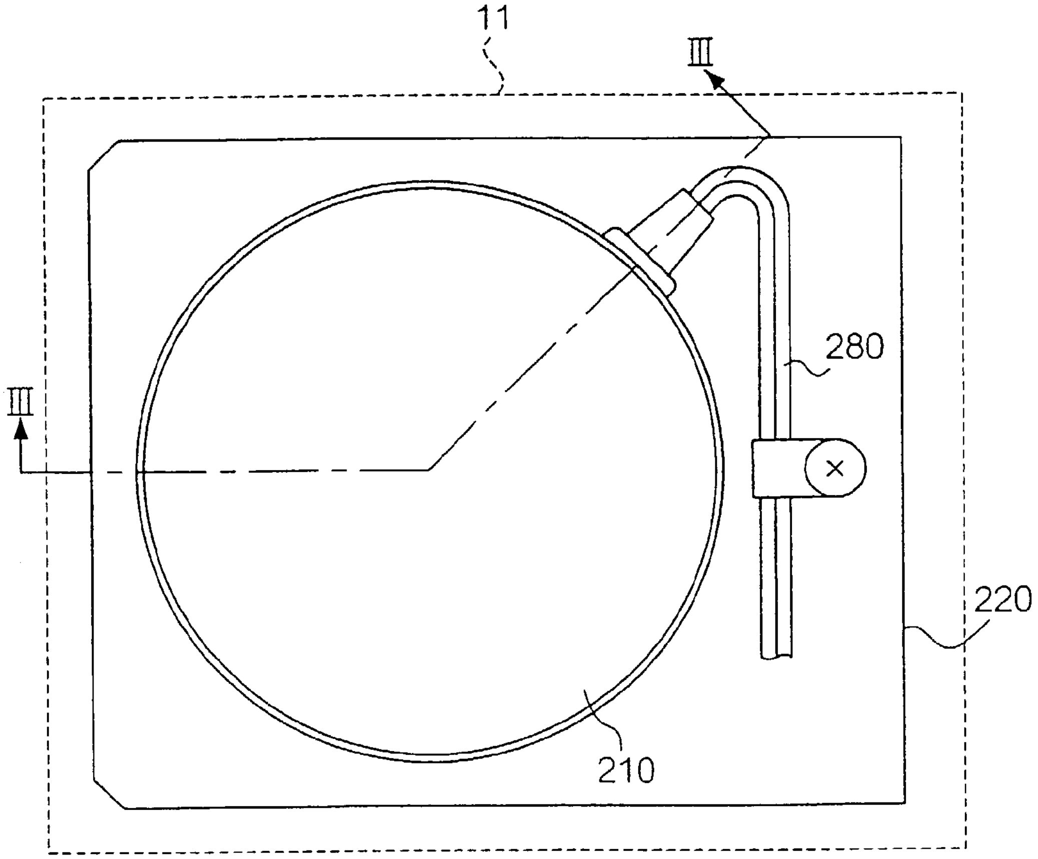
FIG. 6 is a view of an actuator employed in the embodiment.
Figure 7:
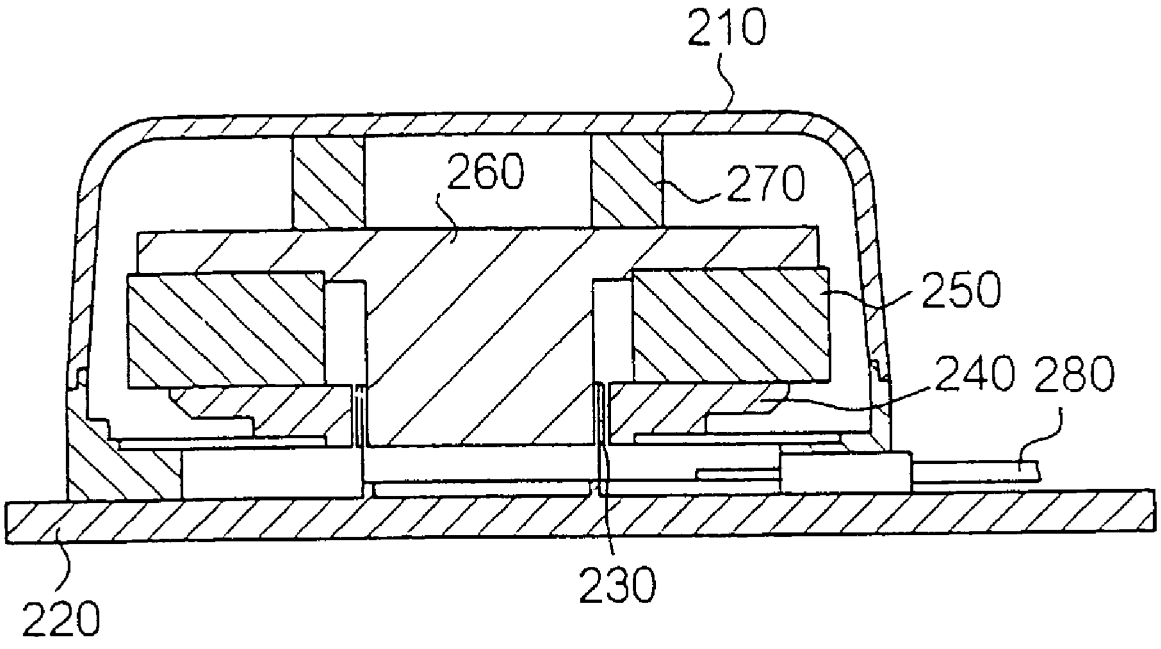
FIG. 7 is a sectional view taken along the III—III line of FIG. 6.

FIG. 6 is a view of the actuator 200 taken in an arrowed direction of FIG. 5, and FIG. 7 is a sectional view of the III—III line of FIG. 6.

Each of the actuators 200 includes a cylindrical cover 210, and a frame 220 fixedly joined with the cylindrical cover 210 by screws or otherwise and capable of transmitted vibrations. The cylindrical cover 210 and frame 220 together constitute a closed container. As illustrated in FIG. 6, the actuator 200 is secured directly to the recessed portion 11 of the reverse surface unit 10 by an adhesive or the like applied to the corresponding reverse surface of the frame 220. Adjacent to a substantially central portion of the frame 220 which may be formed of any suitable material capable of transmitting vibrations, such as aluminum or stainless steel, there is provided a cylindrical member that is fixed at one end. Voice coil 230 is wound on the outer periphery of the other end of this cylindrical member.

Further, in a substantially central portion of the cover 210, there are provided: an annular plate (first pole piece) 240; a permanent magnet 250 having one end surface fixed to the annular plate 240; a bottom member (second pole piece) 260 having one end surface fixed to the other end surface of the permanent magnet 250 and having a central column portion extending toward the frame 220; and a damper member 270 having one end surface fixed to the other end surface of the bottom member 260 and the other end surface fixed to the inner surface of a roof portion of the cover 210.

Here, magnetic flux produced from the permanent magnet 250 forms a closed magnetic path such that it intersects the voice coil 230 via the above-mentioned first pole piece 240 and second pole piece 260. Once an electric signal corresponding to a sound to be propagated in the water is supplied from the vibration control device 300 to the voice coil 230 via a cable 280, the electric signal is converted into a mechanical vibration signal by means of the first and second pole pieces 240 and 260 and voice coil 230, and the mechanical vibration signal vibrates the frame 220 capable of transmitting vibrations. Because the frame 220 is directly secured to the recessed portion 11 of the reverse unit 10 by an adhesive or otherwise as noted above, the vibrations produced in the frame 220 are transmitted to the whole of the thin plate-shaped reverse unit 10 disposed between the flanges 8, so that the vibrations can be radiated as a sound into the water stored in the pool 1 (see FIG. 5).

Figure 8:
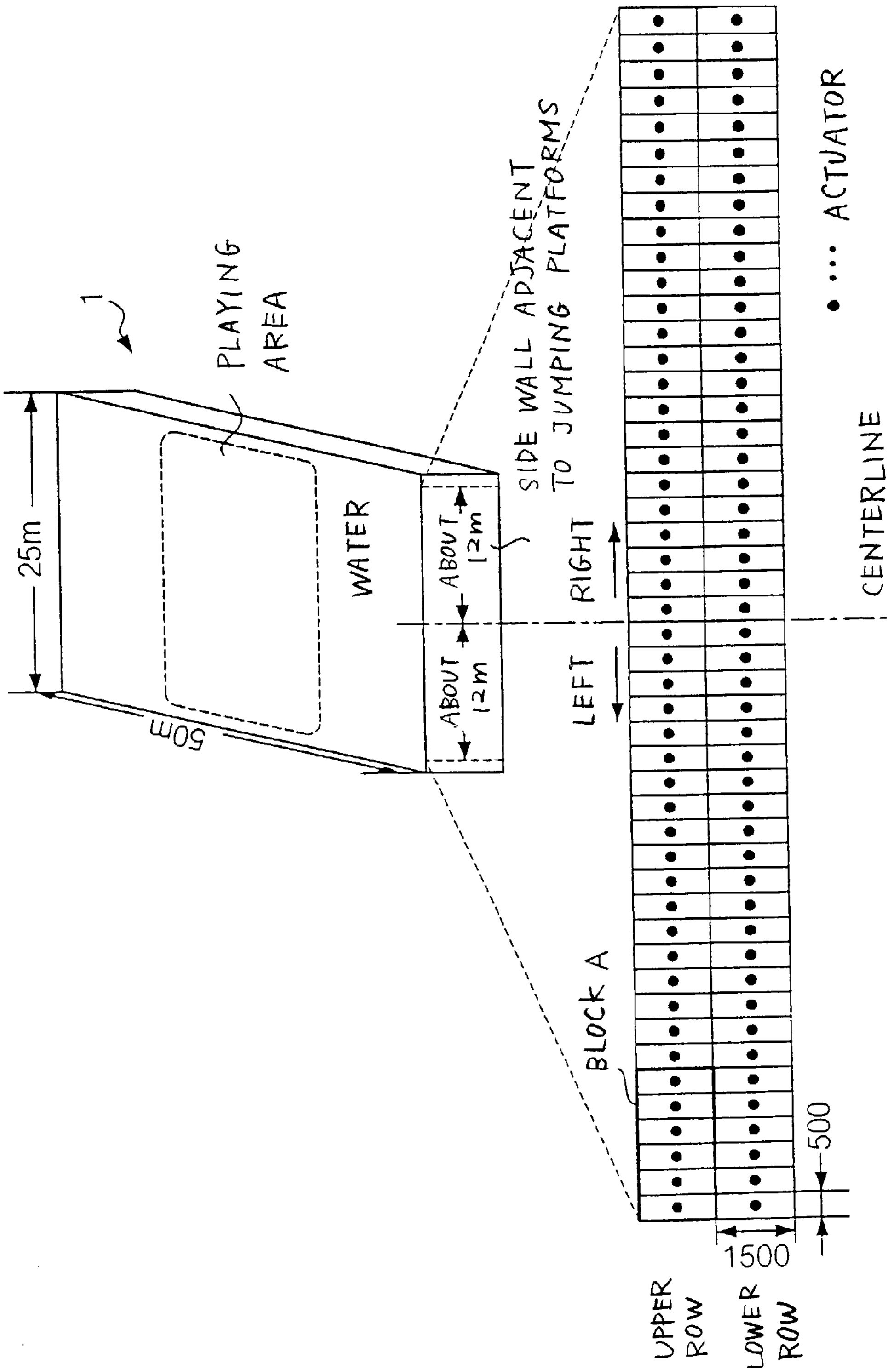
FIG. 8 is a diagram schematically showing an example of arrangement of the actuators relative to a wall of the swimming pool.

FIG. 8 is a diagram schematically showing an example of arrangement of the actuators 200 relative to a wall of the swimming pool 1.

In the illustrated example, the swimming pool 1 of FIG. 8 has a 50 m length, 25 m width and 3 m depth, and it has a total of 96 actuators 200 provided on the reverse (outer) surface (i.e., the surface facing the exterior of the pool 1) of one of rows of the side wall units 2 which is adjacent to (right below) diving platforms; the one row of the side wall units 2 will hereinafter also be called a "predetermined actuator-installing side wall". Specifically, on the reverse surface of the predetermined actuator-installing side wall adjacent to the diving platforms, there are provided a left upper row of 24 actuators 200 placed at uniform intervals to the left of a centerline of the side wall, and a left lower row of 24 actuators 200 placed at uniform intervals to the left of the centerline; each of the left rows extends over about 12 m.

Similarly, there are provided a right upper row of 24 actuators 200 placed at uniform intervals to the right of the centerline, and a right lower row of 24 actuators 200 placed at uniform intervals to the right of the centerline; each of the right rows also extends over about 12 m. On the reverse surface of the predetermined actuator-installing side wall, there are provided a multiplicity of the reverse surface units 10 each having a 50 mm width and 1,500 mm height as noted above in relation to FIG. 4. To mount these actuators 200 on the respective reverse surface units 10, a substantial central position of each of the reverse surface units 10 is determined, and then the actuator 200 is mounted on the thus-determined central position of the corresponding reverse surface unit 10. In this way, a plurality of the actuators 200 can be mounted on the reverse surface of the side wall at uniform intervals. The actuators 200, having thus been mounted on the reverse surface of the predetermined actuator-installing side wall, are connected to the vibration control device 300 via the cable 280; the front or inner surface of the predetermined actuator-installing side wall constitutes the pool's wall surface adjacent to (right below) the jumping platforms.

<Construction of Vibration Control Device 300>

Figure 9:
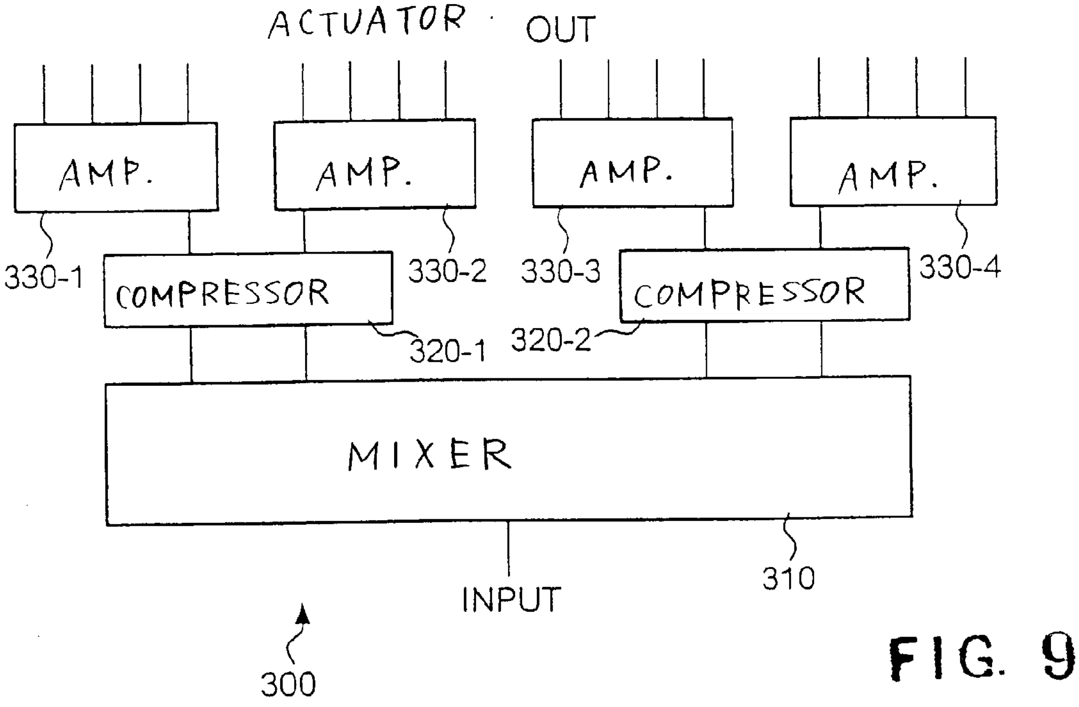
FIG. 9 is a block diagram showing an example of construction of a vibration control device employed in the embodiment.

FIG. 9 is a block diagram showing an example of construction of the vibration control device 300, which includes a mixer 310, compressors 320-1 and 320-2, and amplifiers 330-1 to 330-4. The two compressors 320-1 and 320-2 and four amplifiers 330-1 to 330-4 will hereinafter be referred to by reference numerals 320 and 330, respectively, when there is no need to particularly distinguish between the individual compressors and between the individual amplifiers.

The mixer 310 receives sound signals input via a microphone (not shown) or the like, tone signals of background music generated or reproduced by a tone generation/reproduction device (also not shown), etc. then performs a mixing process on the received input signals, and outputs the thus-mixed signals to the compressors 320. This mixer 310, which has an equalizing function and level adjusting function, divides the mixed signal of each channel into signals of four channels and performs the equalizing and level-adjusting processes on each of the divided signals, so as to output the thus-processed signals to the compressors 320.

Each of the compressors 320 is constructed as a two-channel input/two-channel output compressor, which controls input signals from the mixer 310 so that signals to be supplied to the actuator 200 are prevented from becoming excessive and then supplies the thus-controlled signals to the corresponding amplifiers 330.

Each of the amplifiers 330 is constructed as a one-channel input/four-channel output amplifier, which amplifies a signal of one channel input from the mixer 310 via the corresponding compressor 320, divides the thus-amplified signal into signals of four channels and thereby outputs the divided signals to the corresponding actuators 200. Specifically, the amplifiers 330-1, 330-2, 330-3 and 330-4 are connected to the respective 24 actuators 200 of the left upper row, left lower row, right upper row and right lower row, respectively, shown in FIG. 8.

Figure 10:
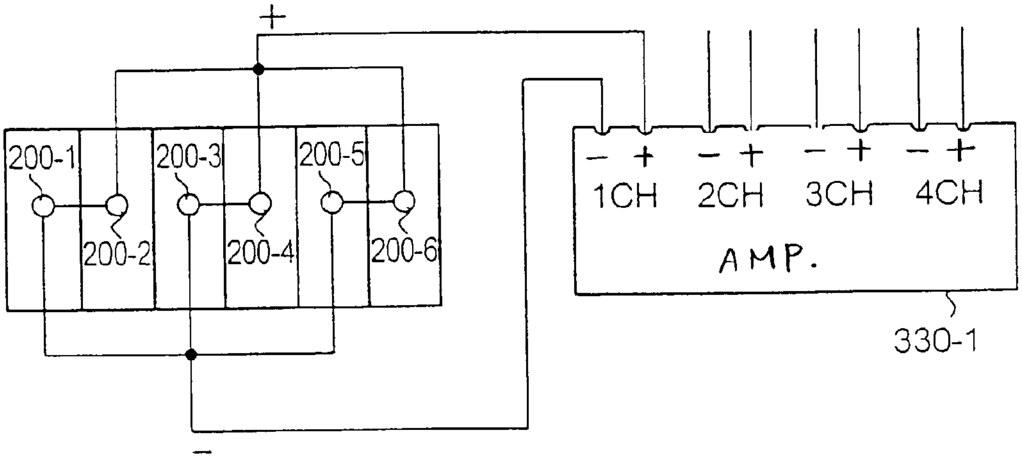
FIG. 10 is a diagram showing an exemplary manner in which the actuators are connected with terminals of an amplifier in the embodiment.

FIG. 10 is a diagram showing an exemplary manner in which the actuators 200 and the amplifier 330 are connected with each other. In the illustrated example of FIG. 10, the six actuators 200-1 to 200-6 are the actuators shown in block A of FIG. 8. The actuators 200-2, 200-4 and 200-6 are connected to the 1st-channel positive terminal of the amplifier 330-1 while the actuators 200-1, 200-3 and 200-5 are connected to the 1st-channel negative terminal of the amplifier 330-1. The actuators 200-2 and 200-1 are connected in series with each other; so are the actuators 200-4 and 200-3 and the actuators 200-6 and 200-5.

Because one channel of the amplifier 330 is used for every six actuators 200, the 24 actuators 200 placed in the left upper row can be driven by the single amplifier 330-1. The other actuators 200 and the other amplifiers 330-2, 330-3 and 330-4 are connected with each other in the same manner as described above, although not specifically described here to avoid unnecessary duplication.

Once the vibration control device 300 arranged in the above-described manner receives a tone signal, representative for example of background music, from the above-mentioned tone generation/reproduction device or the like, it performs the equalizing and level-adjusting processes on the received tone signal and outputs the thus-amplified electric signal to the actuators 200. When, for example, the plurality of actuators 200 provided on the reverse surface of the predetermined actuator-installing side wall are to be driven synchronously in phase with each other, the individual signals of the first to fourth channels divided by the mixer 310 are subjected to similar equalizing and level-adjusting processes.

Thus, electric signals of a same level are supplied from the vibration control device 300 to the plurality of actuators 200 provided on the reverse surface of the predetermined actuator-installing side wall. As a consequence, all of the actuators 200 can be driven synchronously in phase with each other to radiate sounds in the water of the swimming pool 1. The following paragraphs describe various merits or benefits affordable by the underwater sound radiation apparatus 100 of the present invention, in comparison with the underwater speaker discussed earlier in the prior art section of the specification.

<First Benefit>

Figure 11:
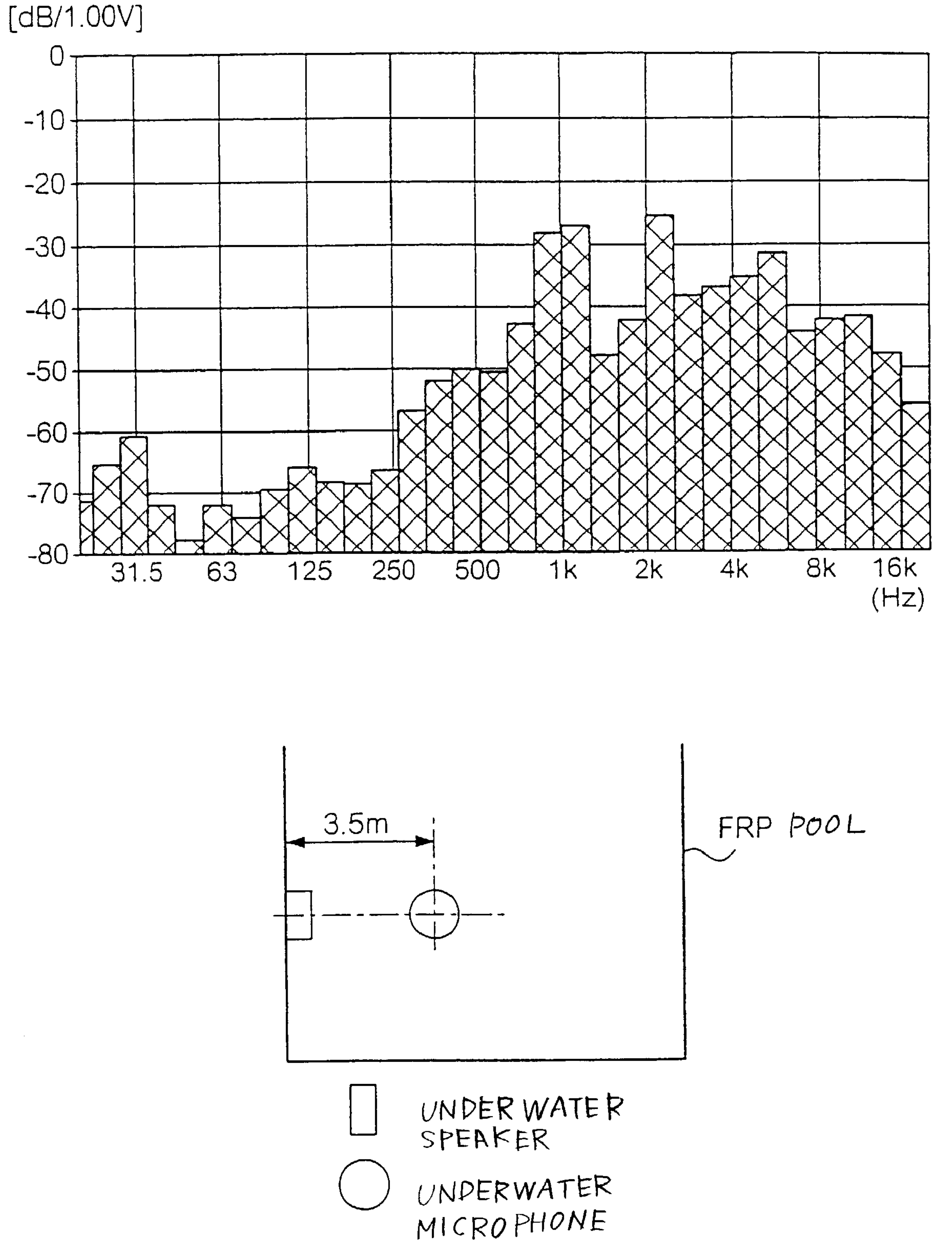
FIG. 11 is a diagram showing results of an experiment where frequency characteristics were evaluated using underwater speakers.

FIG. 11 is a diagram showing results of an experiment where frequency characteristics were evaluated using an underwater speaker under the following conditions. In FIG. 11, the horizontal axis represents frequencies (Hz) of sounds output from the underwater speaker, while the vertical axis represents underwater sound pressure levels (dB) relative to a reference "0 dB" level; namely, a measuring device employed was set to output the reference "0 dB" level in response to an input voltage of 1.0 volt.

a) Experiment Conditions:

The underwater speaker, having a 20 cm diameter and 6 cm height, was installed on one of the side walls of the FRP pool, and an underwater microphone was installed at a distance of 3.5 m from the underwater speaker.

As apparent from the experiment results of FIG. 11, the sound pressure levels obtained when sounds of relatively low frequencies (particularly, frequencies not higher than 250 Hz) were reproduced via the underwater speaker are much smaller than the sound pressure levels obtained when sounds of medium and high frequencies were reproduced. This is due to the fact that the wavelengths of sounds in the water (sound speed in the water is about 1,460 m/s) are longer than the wavelengths of sounds in the air (sound speed in the air is about 340 m/s) and the underwater speaker does not have a sufficient vibrating surface area to reproduce such low-frequency sounds of longer wavelengths. In other words, to reproduce low-frequency sounds of longer wavelengths, it is necessary for the underwater speaker to have a sufficient vibrating surface area. In the field of acoustics, it is well known that increasing the vibrating surface area of the underwater speaker can enhance the sound radiating efficiency and provide uniform sound pressure distributions over a wide range (hereinafter, called a "well-known matter").

Figure 12A:
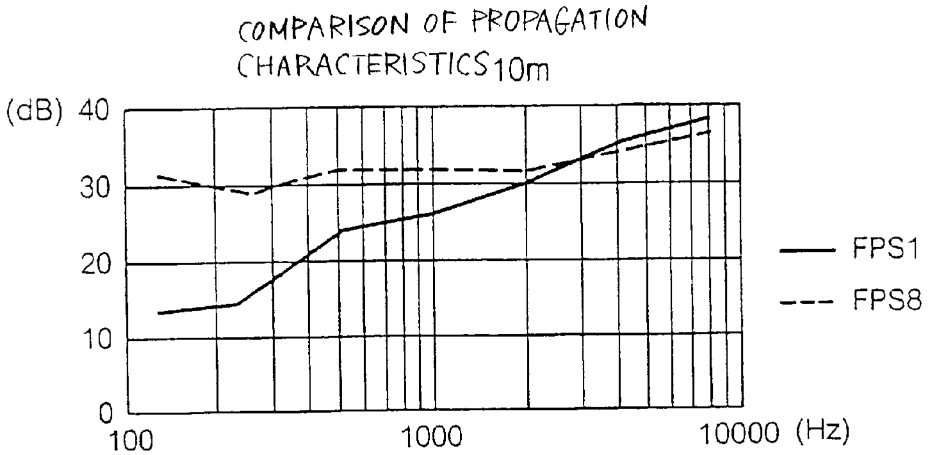
FIGS. 12A to 12C are diagrams showing results of an frequency characteristic evaluating experiment using underwater speaker arrays.
Figure 12B:
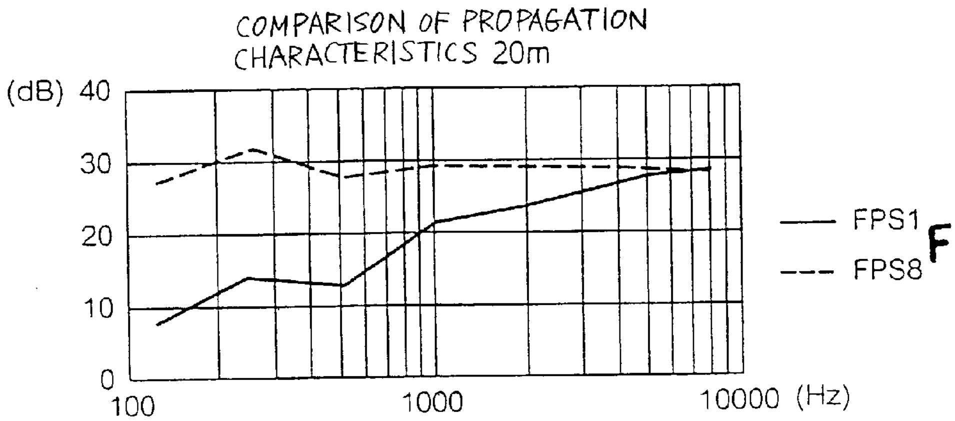
Figure 12C:
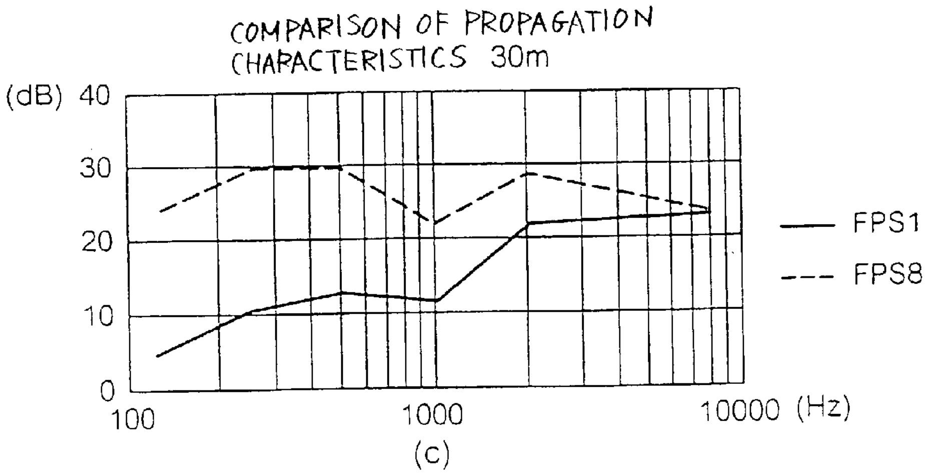
Figure 13:
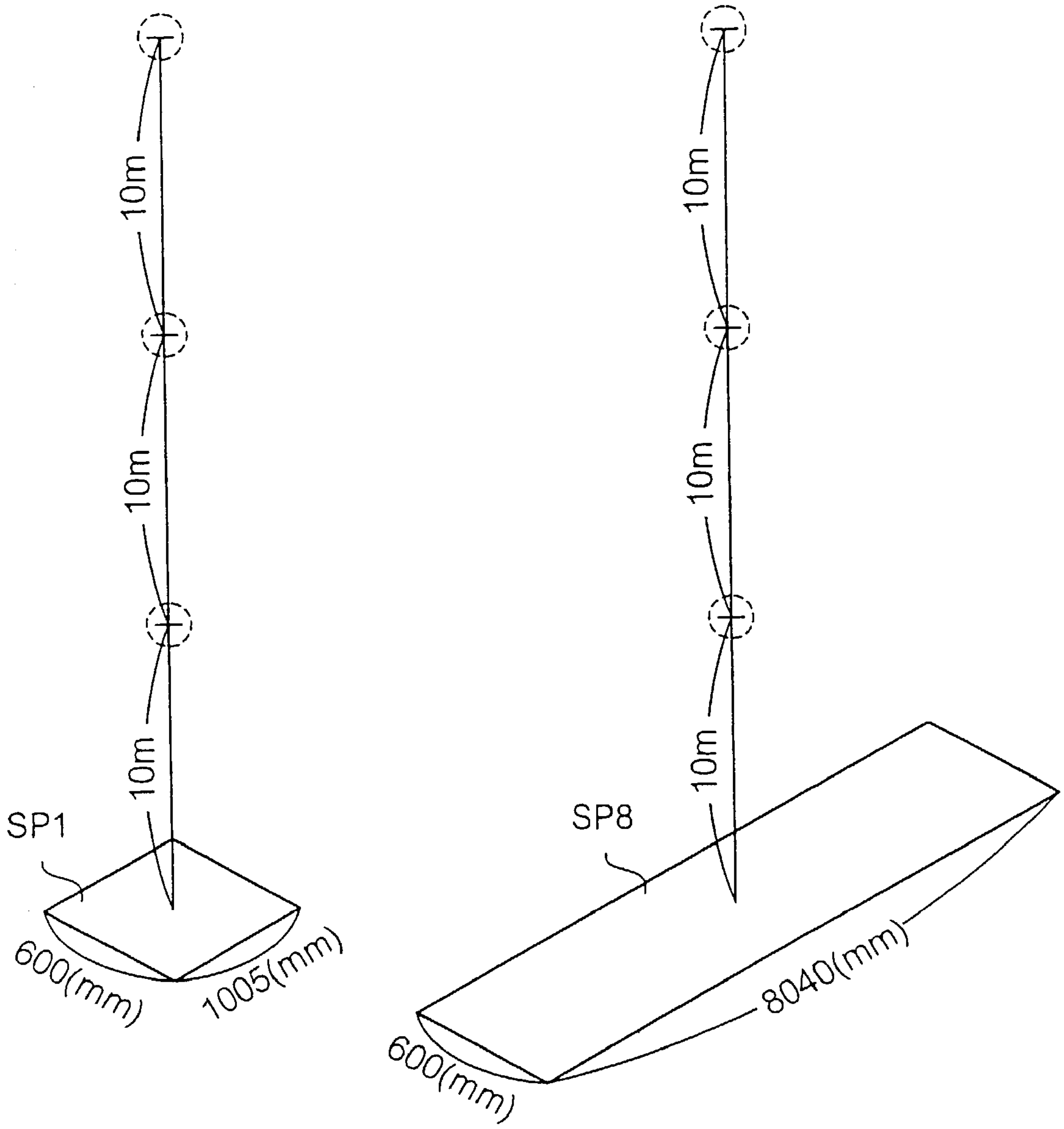
FIG. 13 is a view explanatory of the speaker arrays used in the experiment.

FIGS. 12A to 12C are diagrams showing results of an frequency characteristic evaluating experiment that prove the well-known matter, and FIG. 13 is a view explanatory of a speaker array used in the experiment of FIGS. 12*a* to 12C. In the experiment, there were installed two different speaker arrays, large and small speaker arrays, both comprising a plurality of flat plate-shaped speakers each having a 150 mm height and a 335 mm width, so that frequency characteristics were evaluated by means of the large and small speaker arrays, Details of the experiment were as follows.

<Experiment Conditions> a) Small speaker array SP1: 600 mm by 1,005 mm in size, and b) Large speaker array SP8: 600 mm by 8,040 mm in size.

In the experiment, the small speaker array SP1 was composed of 12 flat plate-shaped speakers (four in each vertical row×three in each horizontal row), while the large speaker array SP8 was composed of 96 flat plate-shaped speakers (four in each vertical row×24 in each horizontal row) (see FIG. 13).

Further, in the experiment, sounds of various frequencies were reproduced through the speaker arrays SP1 and SP8, and sound pressure levels SPF1 and SPF8 were measured at measuring points at distances of 10 m, 20 m and 30 m, respectively, from the individual speaker arrays SP1 and SP8.

FIGS. 12A to 12C show measurements, at the individual measuring points, of sound pressure levels of low-frequency sounds reproduced by the small and large speaker arrays SP1 and SP8. As shown, the sound pressure measurements of the low-frequency sounds reproduced by the large speaker array SP8 were greater than those of the low-frequency sounds reproduced by the small speaker array SP1. Thus, it was proven that increasing the vibrating surface area of the speaker (corresponding to the size of the speaker array) could appropriately reproduce low-frequency sounds of long wavelengths. Whereas FIGS. 12A to 12C show experiment results obtained for sounds radiated in the air, the same benefit of appropriately reproducing low-frequency sounds of long wavelengths by increasing the vibrating surface area of the speaker can also be achieved in cases where the sounds are radiated in another medium than air, such as water.

Referring back to FIG. 8, a multiplicity of the reverse surface units 10, each having a 500 mm width and 1,500 mm height, are disposed on the reverse surface of the actuator-installing side wall composed of the side wall units 2, and each of the reverse surface units 10 has, at its center, the actuator 200 for vibrating the reverse surface unit 10. Further, to drive the actuators 200 on the individual reverse surface units 10 synchronously in phase with each other, the total vibrating surface area equals the total area where the actuators 200 are provided; in this case, it amounts to 72 m (24 m×3 m). The vibrating surface area in the instant embodiment is greater than the vibrating surface area of the underwater speaker (20 cm diameter×6 cm height). Thus, the user of the underwater sound radiation apparatus 100 of the invention achieves the superior benefit that low-frequency sounds of long wavelengths can be reproduced appropriately.

Directional characteristics of the underwater sound radiation apparatus 100 and underwater speaker are determined by a ratio between the diameter of the vibrating surface and the wavelength on the basis of a "circular flat-surface sound source theory" discussed in known literature, e.g. "Study of Electric Sound Vibration" (literally translated), p52–p54, edited by the Institute of Electronics and Communication and published by Corona Publishing Co. Ltd. Because the directional characteristics become sharper as the diameter of the vibrating surface increases, the underwater sound radiation apparatus 100 having a greater vibrating surface area presents sharper directional characteristics than the underwater speaker having a smaller vibrating surface area. Generally, sounds of low frequency bands present nondirectional characteristics while sounds of medium and high frequency bands present sharp directivity; thus, in a swimming pool where a plurality of underwater speakers are installed, frequency characteristic variations would greatly differ from one place to another. By contrast, in the instant embodiment of the present invention where a plurality of the actuators 200 are installed at uniform intervals on a practically entire reverse surface of the predetermined actuator-installing side wall of the swimming pool 1, uniform sound pressure and frequency characteristics can be achieved even in remote areas corresponding to the installed widths of the actuators 200.

<Second Benefit>

Figure 14A:
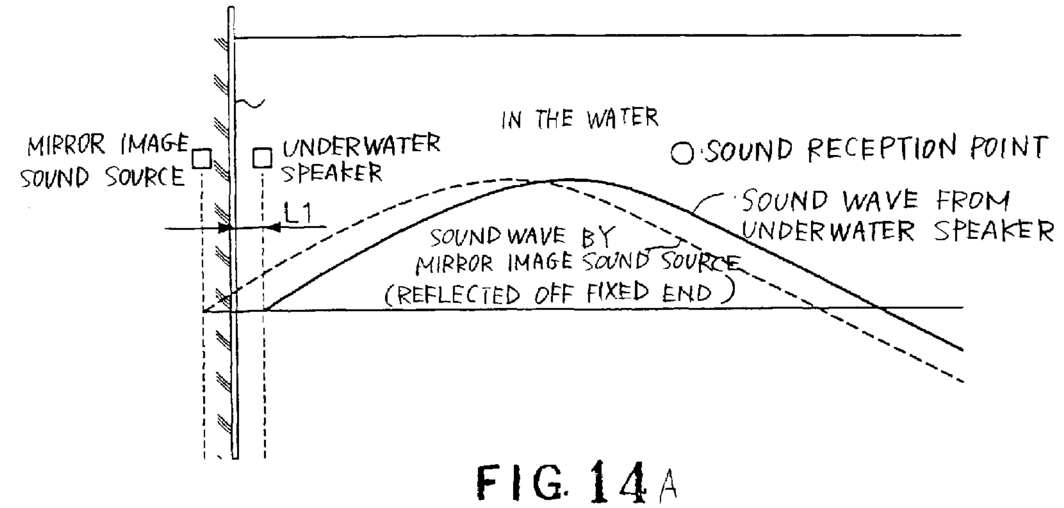
FIGS. 14A and 14B are diagrams explanatory of exemplary manners in which a sound wave radiated from an underwater speaker is reflected off a wall.
Figure 14B:
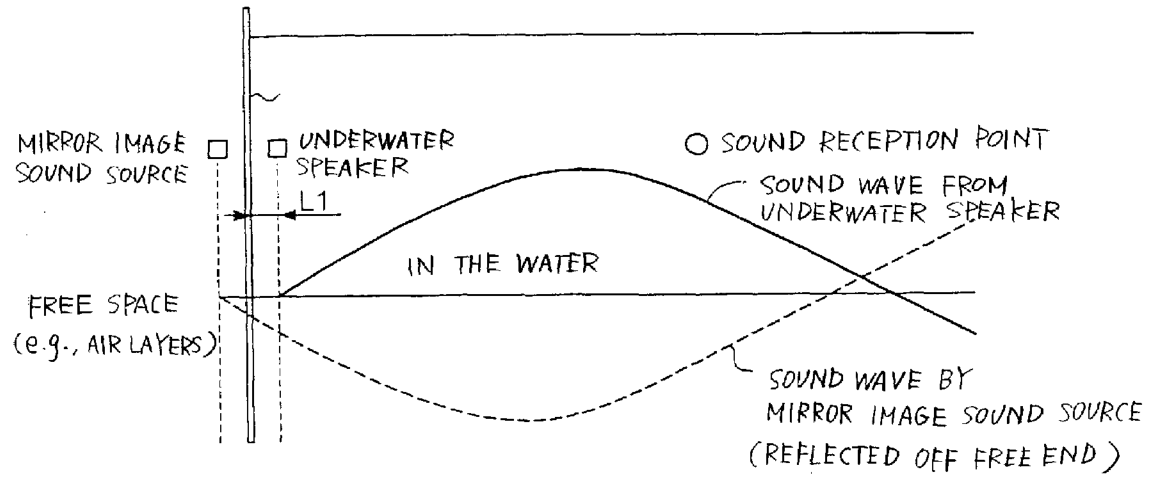

FIG. 14A is a diagram explanatory of an exemplary manner in which a sound wave radiated from an underwater speaker is reflected off a concrete-made wall surface of a swimming pool ("concrete pool"), and FIG. 14B is a diagram explanatory of an exemplary manner in which a sound wave radiated from the underwater speaker is reflected off the wall surface of the FRP pool where the instant embodiment is applied.

As shown in FIG. 14A, in the case where the underwater speaker is installed near (at a distance L1 from) the concrete side wall surface of the concrete pool, a sound wave output from the underwater speaker is reflected off the concrete side wall surface; in this case, because the outer side of the concrete side wall is fixed by concrete, clay, etc., the concrete side wall functions as a fixed end, so that the sound wave reflected off the fixed end will not produce a phase shift (phase inversion). More specifically, it may be assumed that there is installed, in a mirror image position of FIG. 14A, a virtual sound source (mirror image sound source) outputting a sound wave of a same phase as the underwater speaker (namely, a sound wave with no phase difference from the sound wave output from the underwater speaker). Particularly, where the distance L1 between the underwater speaker and the concrete side wall surface is smaller than the wavelength of the sound wave radiated from the underwater speaker, the sound wave radiated from the underwater speaker is hardly cancelled by the sound wave radiated from the mirror image sound source (i.e., the sound wave reflected off the fixed end).

On the other hand, in the case where the underwater speaker is installed near (at a distance L1 from) the FRP side wall surface of the FRP pool, a sound wave output from the underwater speaker is reflected off the FRP side wall surface. However, in this case, the side wall itself is free to vibrate because the FRP side wall is soft as compared to the concrete side wall and air layers are present, as a free space, adjacent the outer side of the FRP side wall. Therefore, when the sound wave is reflected off the FRP side wall surface, the side wall surface itself vibrates and thus functions as a free end, so that the sound wave reflected off the free end produces a phase shift due to the reflection; the phase shift amount is represented by $\pi$. More specifically, it may be assumed that there is installed, in a mirror image position of FIG. 14B, a virtual sound source (mirror image sound source) outputting a sound wave with a phase shift $\pi$ (phase inversion). In this case, the sound wave radiated from the underwater speaker is cancelled by the sound wave radiated from the mirror image sound source (i.e., the sound wave reflected off the free end), with the result that the sound as a whole is undesirably reduced in level. Particularly, when a low-frequency sound wave of a long wavelength is radiated from the underwater speaker, the above-mentioned inconvenience becomes very noticeable. The above-discussed phenomena specific to the FRP pool is indeed a new knowledge acquired by the applicant of the present application through experiments and the like.

In the instant embodiment of the underwater sound radiation apparatus 100, the actuators 200, installed on the practically entire reverse surface of the predetermined actuator-installing side wall of the swimming pool 1, positively vibrate the side wall itself to radiate sounds in the water (see FIG. 8). Therefore, with the underwater sound radiation apparatus 100, there is no possibility, either in theory or in reality, of a phase-inverted sound wave being produced from a virtual or mirror image sound source; thus, no sound will be cancelled by generation of a phase-inverted sound wave due to frequency characteristics. As a result, the underwater sound radiation apparatus 100 permits clear reproduction of sounds over wide frequency bands.

<Third Benefit>

As noted above, the actuators 200 in the instant embodiment are installed on the practically entire reverse surface of the predetermined actuator-installing side wall of the swimming pool 1. Namely, in the instant embodiment of the present invention, the actuators 200 need not be installed underwater, unlike the above-mentioned underwater speaker; this means that the instant embodiment can eliminate the needs for a space and facilities for installing an underwater speaker within the swimming pool 1 (e.g., facilities for hanging the underwater speaker, dedicated box and protecting member for the underwater speaker). Further, although there is a limitation on a maximum allowable depth of water (e.g., 10 m depth) up to which the underwater speaker can be installed, the actuators 200 can be applied suitably even to a very deep swimming pool having more than 10 m depth because they are installed on the reverse surface of the predetermined actuator-installing side wall of the pool 1.

<Fourth Benefit>

Further, where the underwater speaker is to be installed within the pool, it has heretofore been necessary to determine a proper installed position taking the directional characteristics of the underwater speaker. However, in the instant embodiment, it is only necessary that the actuators 200 be installed at uniform intervals on the practically entire reverse surface of the side wall of the pool 1, so that fine adjustment etc. are unnecessary.

<Fifth Benefit>

Furthermore, in the case where the underwater speaker is to be installed within the pool, it is necessary to install and remove the speaker for each of various intended events or uses, such as a swimming race and synchronized swimming. In contrast, the instant embodiment of the present invention, where the actuators 200 are installed on the outer side of the swimming pool 1, can appropriately deal with various events and uses by just individually turning ON/OFF the actuators 200. Therefore, the underwater sound radiation apparatus 100 can be installed permanently, which can thereby eliminate the need for troublesome operations to install and remove the components of the apparatus 100 for each of various intended events and uses.

<Sixth Benefit>

In addition, the conventional underwater speaker has been unsatisfactory in that available types of the underwater speaker are limited considerably due to its special specifications and the underwater speaker was also very costly. However, because conventional actuators, amplifiers, etc. may be used as the actuators 200, amplifiers 330, etc. in the instant embodiment, the underwater sound radiation apparatus 100 can be manufactured and installed at very low cost.

<Seventh Benefit>

Moreover, because the underwater speaker is installed under water, it has been necessary to provide a waterproofing structure for preventing entry of water into the underwater speaker and a safety circuit for detecting a short circuit or leakage of electricity in an amplifier and the like built in the underwater speaker to thereby automatically shut off the electricity, among other things.

B. Modifications:

It should be appreciated that the embodiment of the present invention having been described above is just illustrative and may be modified variously without departing from the basic principles of the invention. Examples of such modifications include the following.

<Modification 1>

Whereas the embodiment of the present invention has been described in relation to the swimming pool 1 assembled by joining together the plurality of FRP-made units, the present invention is also applicable to another type of swimming pool 1 formed of stainless steel plates, aluminum plates and/or the like. Namely, the present invention is applicable to all types of swimming pools formed of a material that can be vibrated by the actuators 200. Further, the present invention is of course applicable to a fixedly or permanently installed swimming pool, although it has been described above in relation to a provisional swimming pool.

Further, whereas the embodiment of the present invention has been described above as applied to a swimming pool composed of thin plate-shaped walls made of an FRP material (FRP pool), it is also applicable to a swimming pool composed of fixed concrete walls (concrete pool). Specifically, according to such a modification, FRP-made partitioning plates are provided in the concrete pool, and the actuators 200 are fixed in tight contact with the FRP partitioning plates to radiate sounds. More specifically, if the concrete pool has a 50 m length, 25 m width and 3 m depth, FRP partitioning plates having, for example, a 25 m width and 3 m height (depth) are provided in a suitable position (e.g., three meters from the predetermined side wall as measured in the longitudinal direction of the pool.

<Modification 2>

The embodiment has been described above in relation to the electrodynamic-type actuators. As a modification, the actuators 200 may be of a piezoelectric type, electromagnetic type, electrostatic type or the like depending on the design etc. of the underwater sound radiation apparatus 100. However, considering that a multiplicity of such actuators 200 are used in the apparatus 100, small-sized and high-power actuators, for example, of the piezoelectric type or electrodynamic type are desirable.

<Modification 3>

Furthermore, in the above-described embodiment, the actuators 200 are installed at uniform intervals across the practically entire reverse surface of the predetermined actuator-installing side wall of the pool 1. As a modification, the actuators 200 may be installed only on a predetermined area (e.g., 10 m ranges to the left and right of the centerline shown in FIG. 8) of the actuator-installing side wall. Moreover, the actuators 200 may be installed on two or more side walls, rather than on just one side wall, such as a pair of adjoining side walls or a pair of opposed side walls. Furthermore, whereas the actuators 200 in the above-described embodiment are installed on the reverse surface of the actuator-installing side wall in the upper and lower horizontal rows, the actuators 200 may be installed only in the upper horizontal row. Where the present invention is applied to a swimming pool of a relatively great depth, the reverse surface of the predetermined actuator-installing side surface may be divided into a greater number of horizontal rows, such as upper, medium and lower horizontal rows, so that the actuators 200 are installed on each of the horizontal rows.

<Modification 4>

Figure 15:
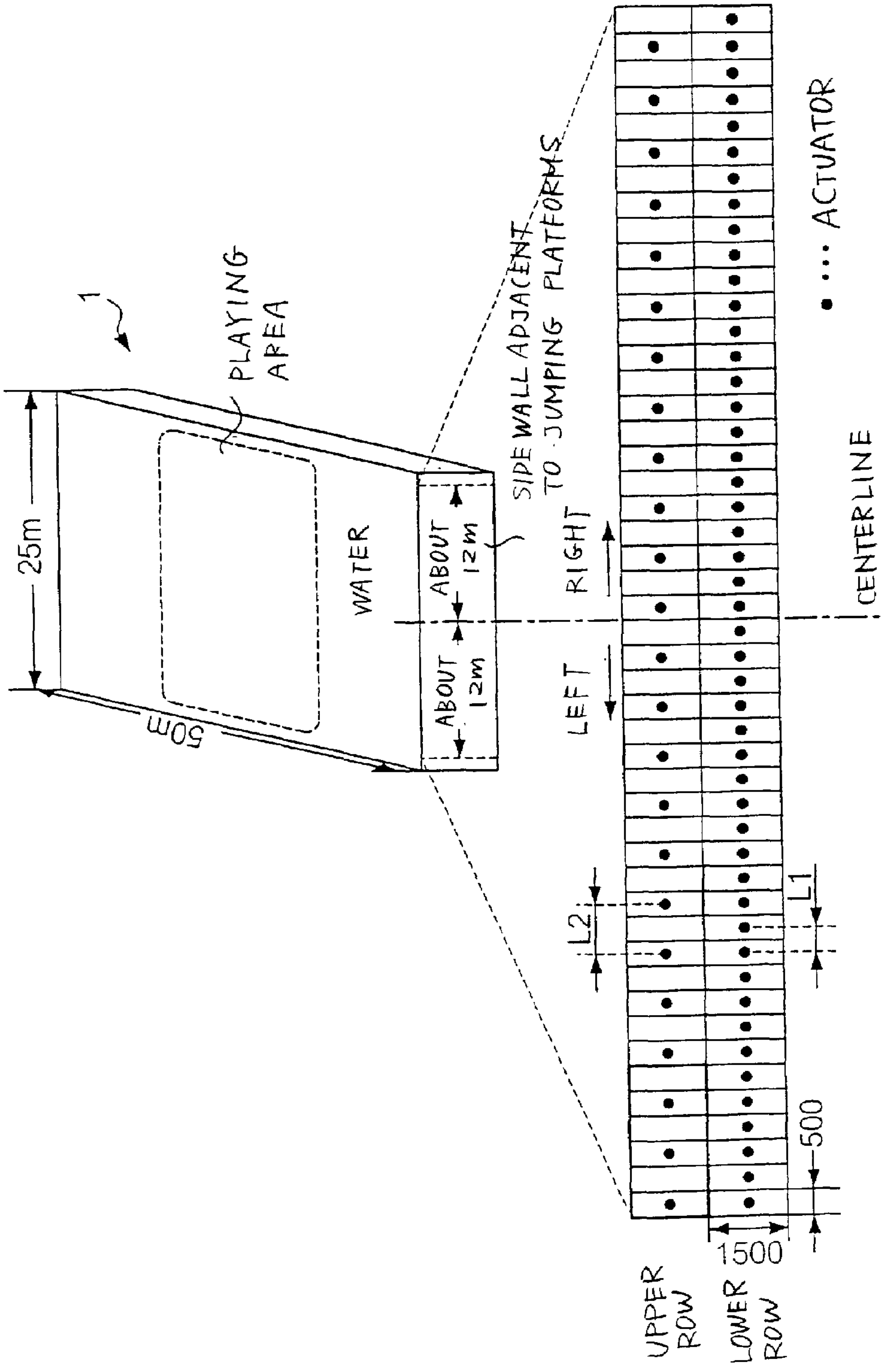
FIG. 15 is a diagram schematically showing a modified example of the arrangement of the actuators relative to the wall of the swimming pool.

FIG. 15 is a diagram schematically showing a modified example of the arrangement of the actuators 200 relative to the side wall of the swimming pool 1. In this fourth modification, as shown in FIG. 15, 48 actuators 200 are installed, at first uniform intervals L1, in a lower horizontal row on the reverse surface of the predetermined actuator-installing side wall of the swimming pool 1, and 24 actuators 200 are installed, at second uniform intervals L2 (=2*L1), in an upper horizontal row on the reverse surface of the predetermined actuator-installing side wall of the swimming pool 1. Namely, as illustrated in FIG. 15, the intervals at which the actuators 200 are installed in the upper horizontal row on the reverse surface of the predetermined actuator-installing side wall and the intervals at which the actuators 200 are installed in the lower horizontal row may be differentiated from each other. Moreover, the actuators 200 may be installed at random intervals, rather than at uniform intervals, on the reverse surface of the predetermined actuator-installing side wall, as long as the above-discussed various benefits can be achieved.

Figure 16:
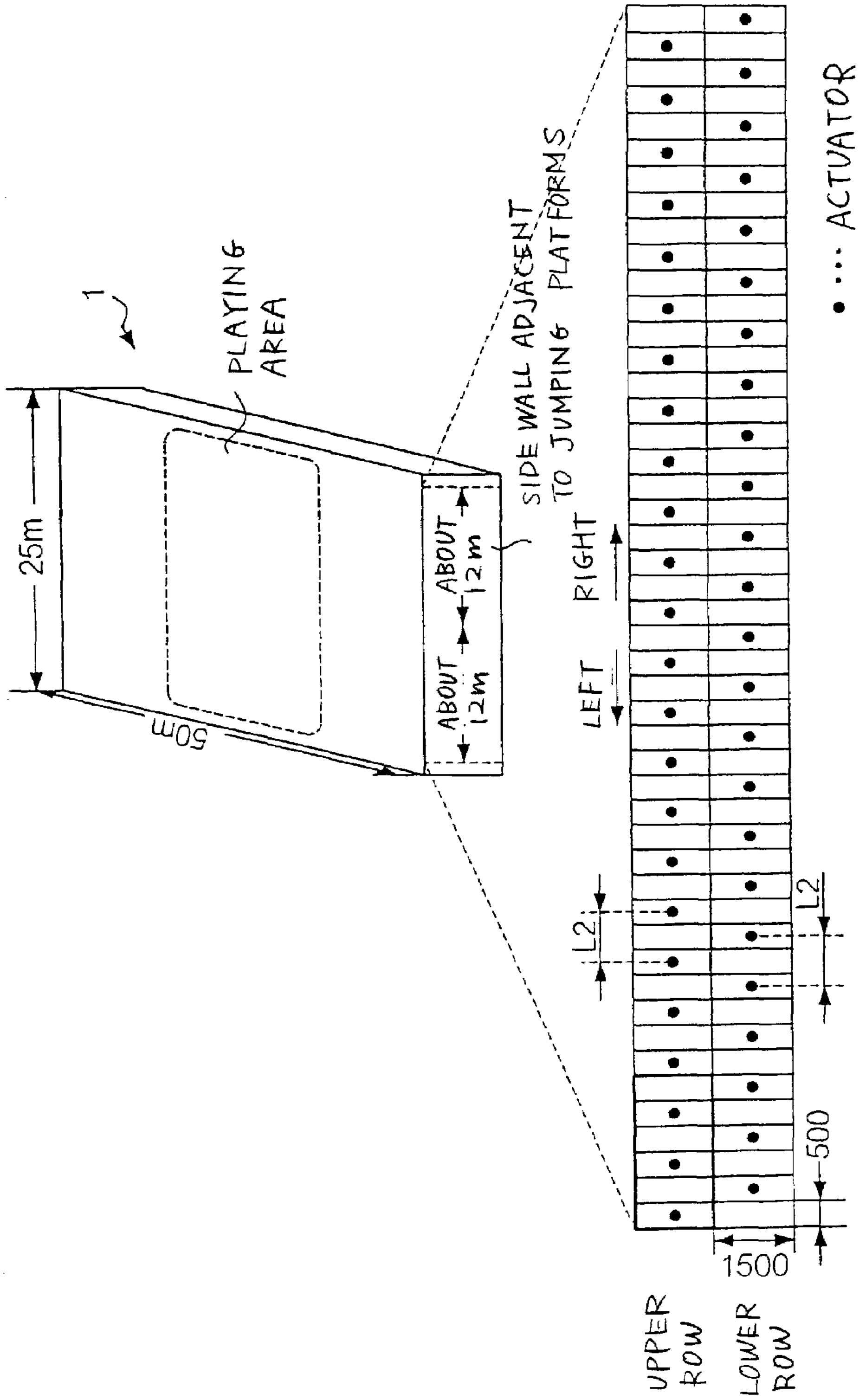
FIG. 16 is a diagram schematically showing another modified example of the arrangement of the actuators relative to the wall of the swimming pool.

FIG. 16 is a diagram schematically showing another modified example of the arrangement of the actuators 200 relative to the side wall of the swimming pool 1. As shown in the figure, a total of 48 actuators 200 are installed in a staggered layout on the reverse surface of the predetermined actuator-installing side wall. Specifically, in each of the upper and lower horizontal rows on the reverse surface of the predetermined actuator-installing side wall, 24 actuators 200 are installed at uniform intervals L2; however, the 24 actuators 200 in the upper horizontal row are arranged in staggered relation to the 24 actuators 200 in the lower horizontal row.

Figure 17:
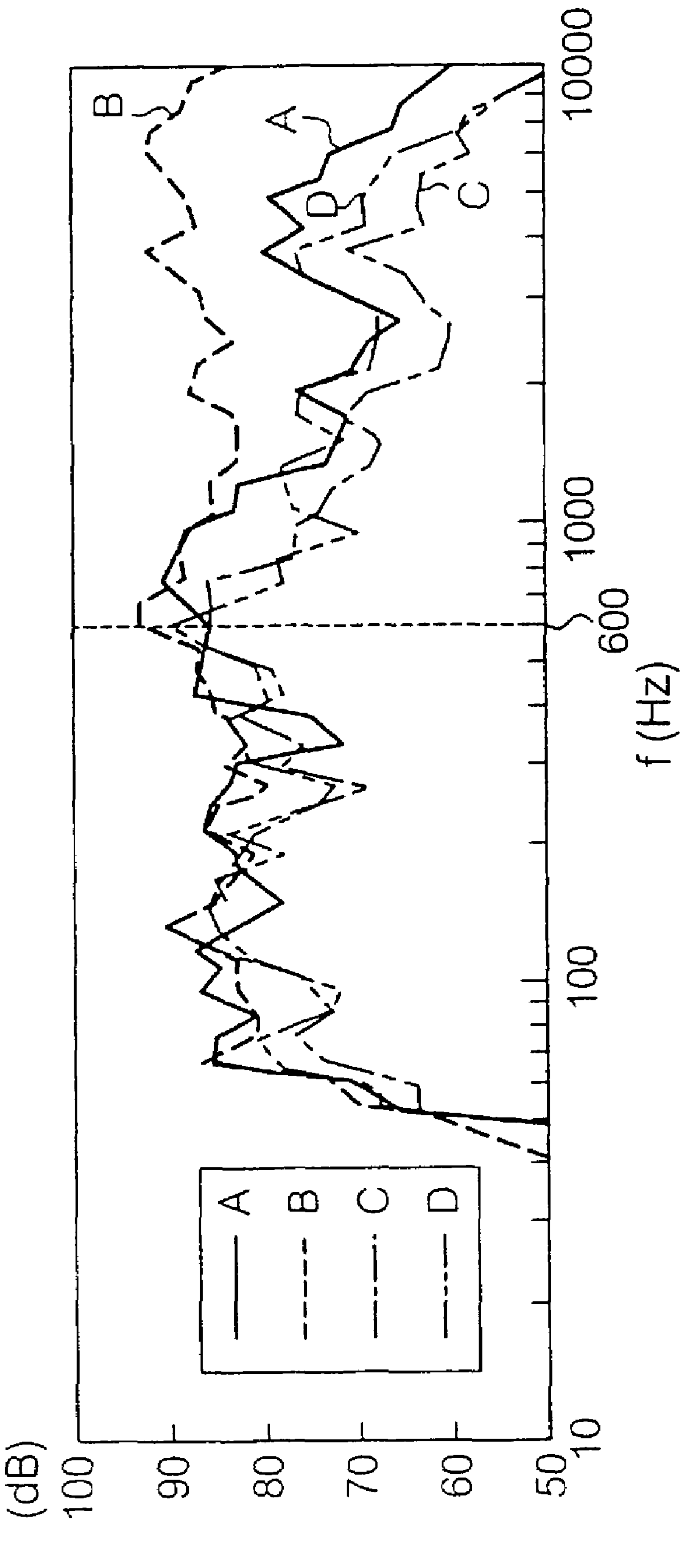
FIG. 17 is a diagram showing vibration acceleration levels measured when the actuators were driven in the modified example of FIG. 16.
Figure 18:
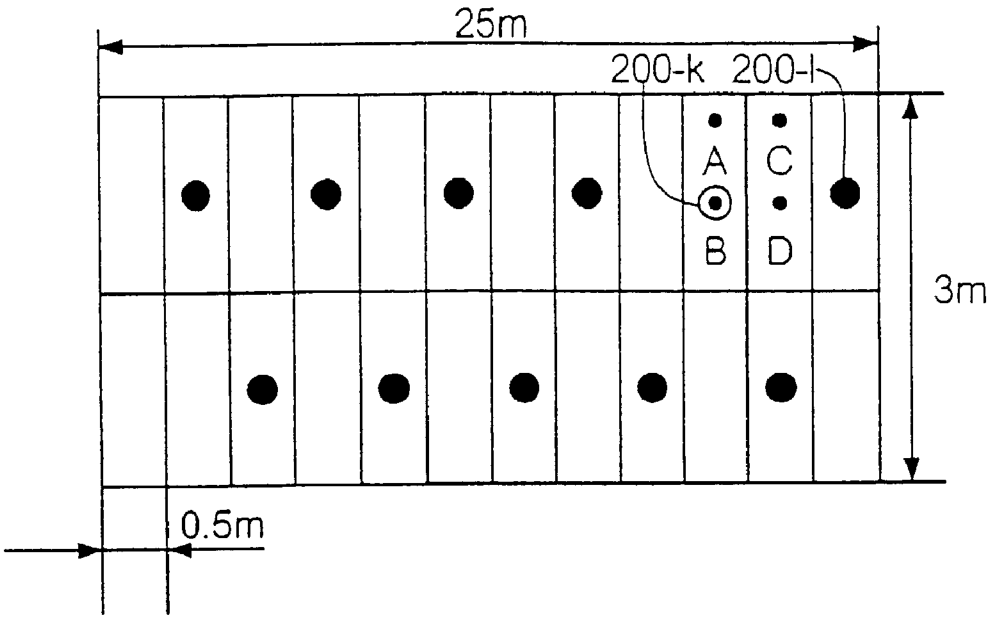
FIG. 18 is an enlarged fragmentary view of a predetermined actuator-installing side wall of the swimming pool shown in FIG. 16.

FIG. 17 is a diagram showing vibration acceleration levels of the predetermined actuator-installing side wall measured when the actuators 200 were driven in the modified example having the actuators 200 installed in a staggered layout (see FIG. 16), and FIG. 18 is an enlarged fragmentary view of the predetermined actuator-installing side wall of the swimming pool 1 shown in FIG. 16. For the measurement of the vibration acceleration levels, vibration pickups for detecting vibrations are mounted on predetermined positions ("A" to "D" in FIG. 18) of the inner surface (facing the interior of the pool) of the predetermined actuator-installing side wall.

As seen in FIG. 17, in a frequency range of 10–600 Hz, the measured acceleration level does not greatly differ between point "B" right behind the installed position of the actuator 200-*k* and other points "A", "C" and "D". However, in a frequency range above 600 Hz, the vibration acceleration levels at points A, C and D have a tendency to be lower than the vibration acceleration level at point B. Also, in all the frequency ranges, there is no great difference between the vibration acceleration levels at point A and point D.

Briefly speaking, the vibration pickup provided at point A mainly detects vibrations caused by the actuator 200-*k*. The vibration pickup provided at point D mainly detects vibrations caused by the actuators 200-*k* and 200-1. There is no great difference between the vibration acceleration levels detected by the vibration pickups at point A and point D. Therefore, arranging the actuators 200 at the uniform intervals L2 in a staggered fashion as illustrated in FIG. 16 can be said to be necessary and sufficient arrangement.

By thus arranging the actuators 200 on the reverse surface of the actuator-installing side wall of the pool 1 at the uniform intervals L2 in a staggered layout, this fourth modification can reduce the necessary number of the actuator 200 without inviting deterioration of vibration characteristics. As a consequence, it is possible to minimize the manufacturing costs of the underwater sound radiation apparatus 100.

<Modification 5>

Whereas the embodiment has been described above in relation to the case where a plurality of the actuators 200 are installed on the reverse or outer surface of the predetermined actuator-installing side wall of the swimming pool 1, a plurality of the actuators 200 may be installed on the front, i.e. inner, surface of the predetermined actuator-installing side wall. In this fifth modification, however, there arises needs to provide a waterproofing structure for preventing entry of water into the actuators 200 and a safety circuit for detecting a short circuit or leakage of electricity in an amplifier and the like built in each of the actuators 200 to thereby automatically shut off the electricity. But, this the fifth modification can afford the benefit (first benefit) that uniform sound pressure and frequency characteristics can be achieved even in remote areas corresponding to the installed widths of the actuators 200, the second benefit that sounds of wide frequency bands can be reproduced clearly, and various other benefits. Namely, in a case where there is not a sufficient space for installing the actuators 200 on the reverse surface of the predetermined actuator-installing side wall of the pool 1, a plurality of the actuators 200 may be installed on the front or inner surface of the predetermined actuator-installing side wall.

<Modification 6>

Furthermore, the embodiment has been described above in relation to the case where all of the actuators 200, installed on the reverse surface of the predetermined actuator-installing side wall of the pool 1, are driven synchronously in phase with each other. As a modification, control may be performed so that sounds of lower frequencies are reproduced using, for example, the actuators 200 provided in the lower horizontal row on the reverse surface of the predetermined actuator-installing side wall while sounds of medium and high frequencies are being reproduced using, for example, the actuators 200 provided in the upper horizontal row, and/or that the timing to drive actuators 200 provided in the lower horizontal row is differentiated from the timing to drive actuators 200 provided in the upper horizontal row. Moreover, the vibration control device 300 in the above-described embodiment may be modified to have an effect function, sound quality adjusting function, etc. in order to impart various effects, such as a reverberation effect, to sounds to be radiated in the water via the predetermined actuator-installing side wall.

<Modification 7>

Furthermore, the embodiment has been described as arranged such that each (four-channel-output) amplifier 330 drives 24 actuators 200 (i.e., each amplifier channel drives six actuators 200). As a modification, the number of the actuators 200 to be driven by each amplifier 330 may be varied as necessary depending on the design of the vibration control device 300.

<Modification 8>

Whereas the embodiment has been described in relation to the case where the underwater sound radiation apparatus 100 is applied to the swimming pool 1, the underwater sound radiation apparatus 100 may be applied to tanks, containers, etc. containing liquid media, such as water tanks used to raise underwater plants, aquarium fish or the like, storage tanks, bath tabs, fish ponds and, containers used for brewing of alcoholic drinks, soy sauce, soy bean paste and the like. For example, when applied to a water tank having underwater plants immersed therein, sounds of background music or the like may be radiated within the water tank to raise the underwater plants with an enhanced efficiency. Note that the terms "water tank" used in the context of the present invention refer to any one of tanks capable of storing therein liquid media.

<Modification 9>

Figure 19:
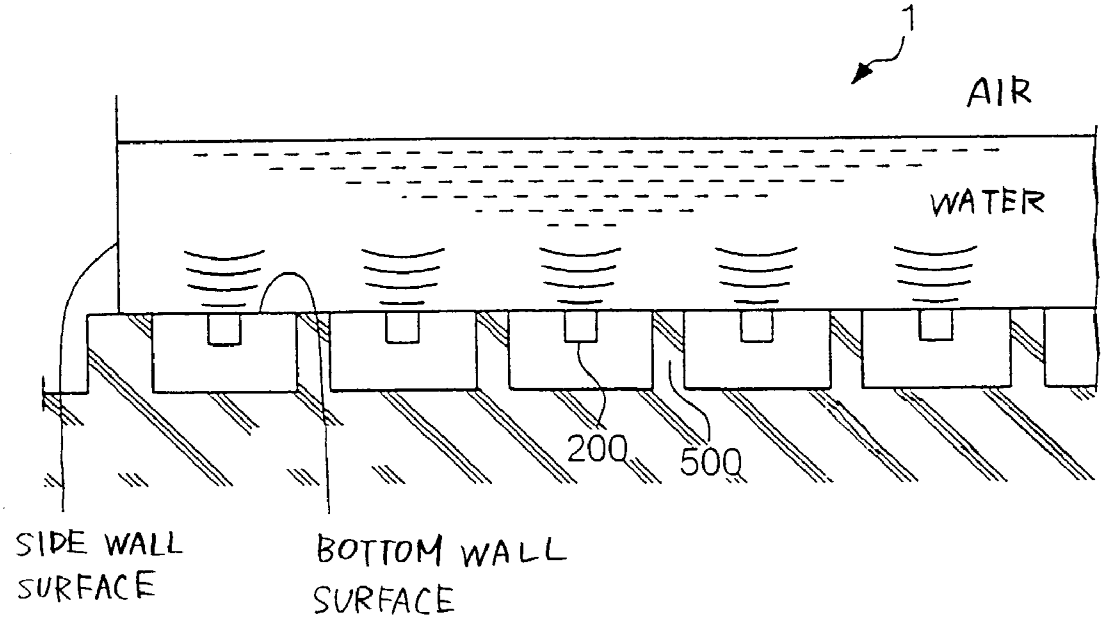
FIG. 19 is a view schematically showing still another example of arrangement of the actuators relative to the wall of the swimming pool.
Figure 20:
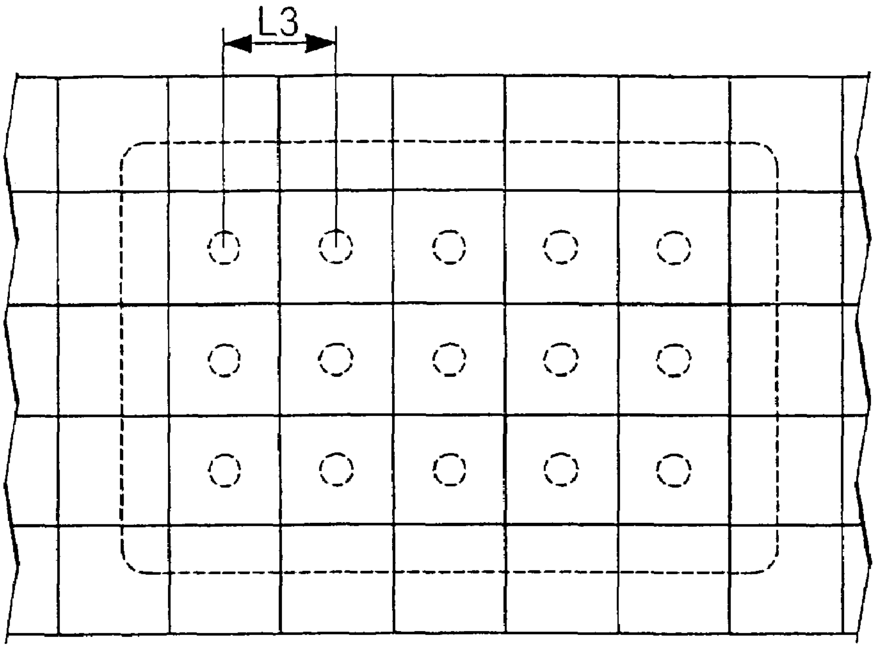
FIGS. 20 and 21 are top plan views of the swimming pool to which the modification of FIG. 19 is applied.
Figure 21:
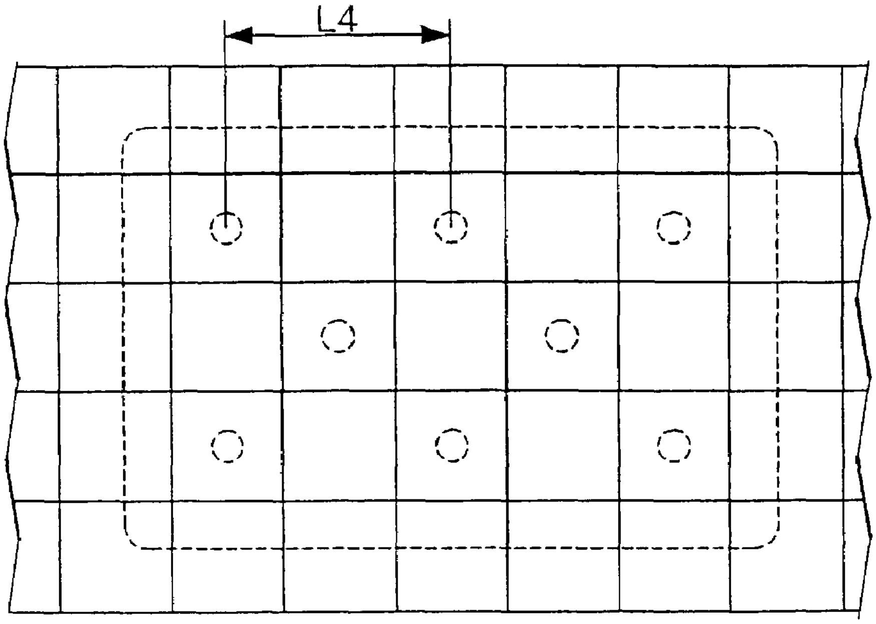

Furthermore, whereas the embodiment has been described in relation to the case where the actuators 200 are installed on the reverse surface of the predetermined actuator-installing side wall of the swimming pool 1, the actuators 200 may be installed on the reverse surface of the bottom wall of the swimming pool 1. FIG. 19 is a view schematically showing an example of arrangement of the actuators 200 relative to the swimming pool 1 in accordance with the ninth modification, and FIGS. 20 and 21 are top plan views of the swimming pool 1.

As illustrated in FIG. 19, the bottom wall of the swimming pool 1 is supported on a plurality of ridges or protrusions 500 formed of a rigid material like concrete. A plurality of the actuators 200 are installed on the reverse or lower surface of the bottom wall of the swimming pool 1 between the ridges 500, in a generally similar manner to the above-described embodiment, so that sounds can be radiated from the bottom wall upwardly toward the surface of the water. The actuators 200 may be installed at predetermined uniform intervals L3 on a portion of the bottom wall, corresponding to a playing or competing area, as illustrated in FIG. 20, or they may be installed at predetermined intervals L4 in a staggered layout on the portion of the bottom wall as illustrated in FIG. 21.

The reason why the actuators 200 are installed on the reverse or lower surface of the bottom wall of the swimming pool 1, rather than the reverse surface of the side wall is as follows. Namely, a sound radiated in the water travels a certain distance while being repetitively reflected between the surface of the water and the upper surface of the bottom wall (so-called "shallow water propagation"). In such "shallow water propagation", if the radiated sound has a low frequency and the water depth becomes substantially equal to the wavelength of the radiated sound, there would occur a phenomenon in which signals of frequencies not higher than a cut-off frequency f0, as represented by Equation (1) below, are not appropriately propagated—details of the cut-off frequency are set forth, for example, in I. Tolstoy and C. S. Clay, "OCEAN ACOUSTICS: Theory and Experiment in Underwater Sound", 1987.

[Equation (1)]

$$\omega_{0m} = \frac{c_2\pi}{h}\left(\frac{c_2^2}{c_1^2}-1\right)^{-1/2}\left(m-\frac{1}{2}\right) = 2\pi f_0 \qquad (1)$$

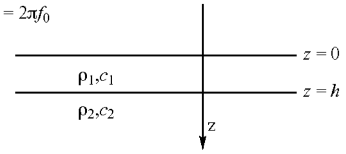

where $\rho_1$ and $\rho_2$ each represents a density of the medium and $c_1$ and $c_2$ each represent a propagation speed in the medium.

Figure 22:
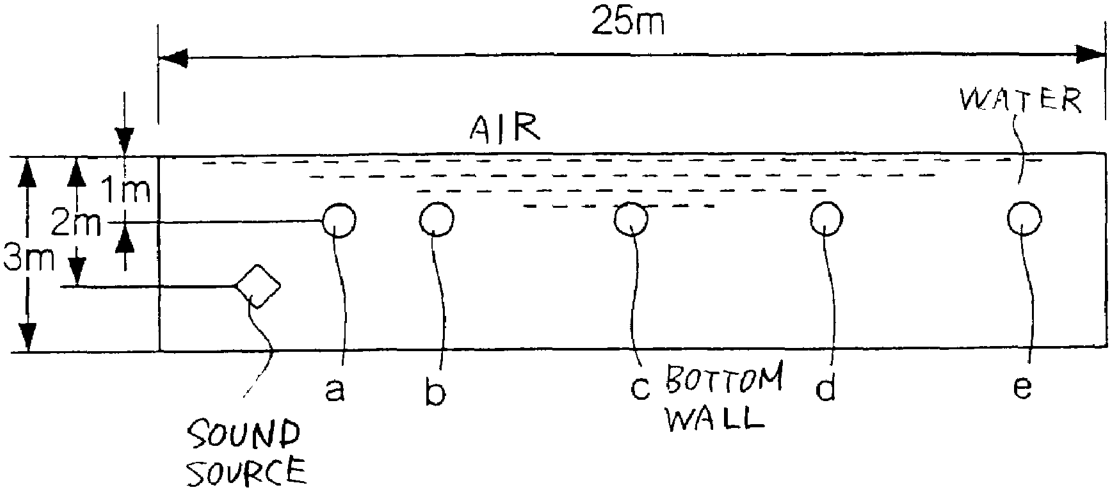
FIG. 22 is a diagram explanatory of conditions etc. under which were simulated frequency characteristic variations in the modification of FIG. 19.
Figure 23:
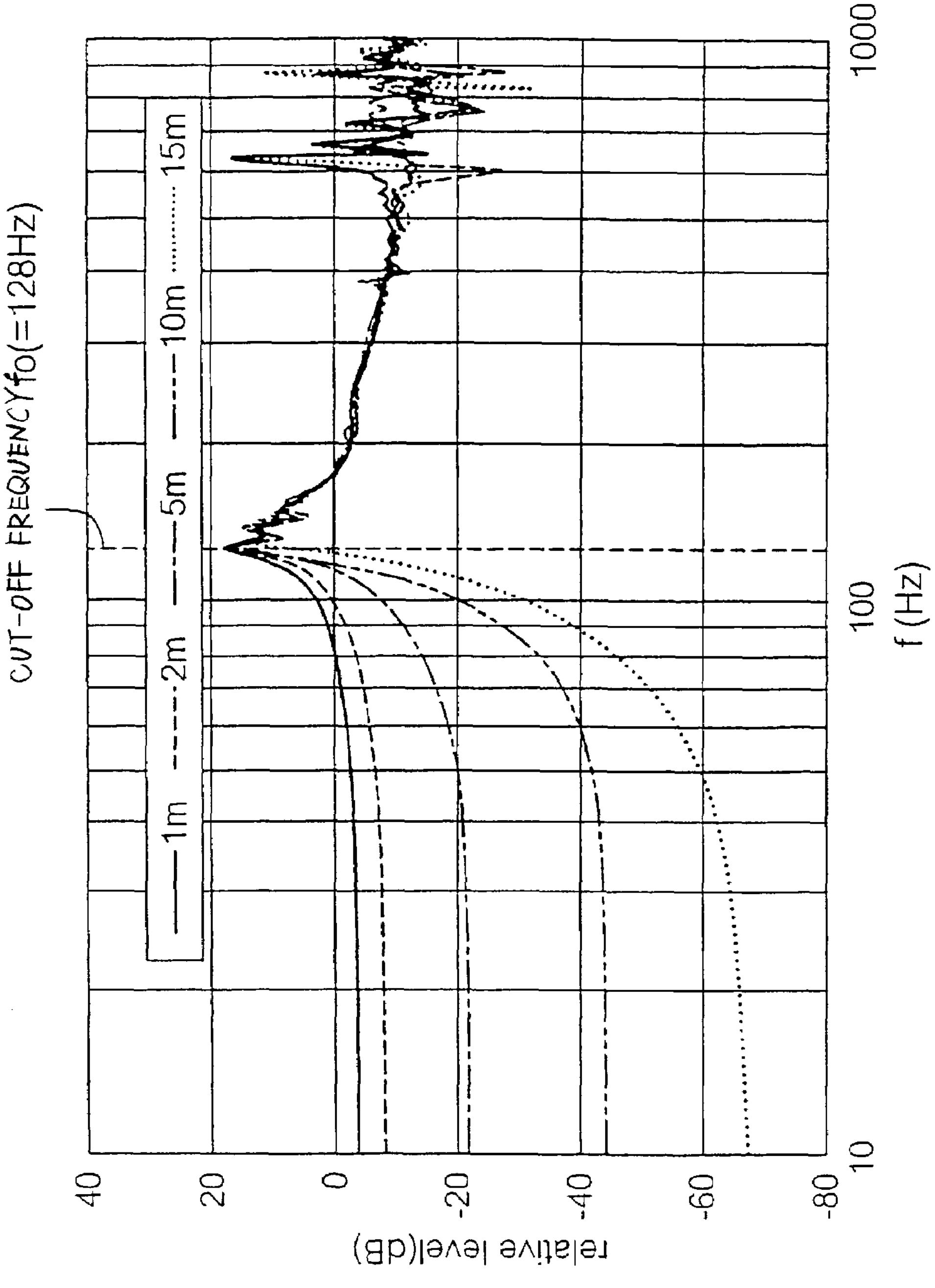
FIG. 23 is a diagram showing results of the simulation carried out in the modification of FIG. 19.

FIG. 22 is a diagram explanatory of conditions etc. under which were simulated frequency characteristic variations responsive to variations of the distance from the sound source in the shallow water, and FIG. 23 is a diagram showing results of the simulation.

As illustrated in FIG. 22, the simulation was executed on the assumption that an underwater speaker functioning as the sound source was positioned at a depth of two meters and underwater microphones were positioned at point "a" to point "e" all located at a depth of one meter but apart from the underwater speaker by one meter, two meters, five meters, ten meters and fifteen meters, respectively.

The simulation showed that while attenuation of sounds having frequencies not higher than the cut-off frequency f0 (=128 Hz) determined on the basis of Equation (1) above is relatively small at points near the sound source, attenuation of sounds having frequencies not higher than the cut-off frequency f0 become greater at points remote from the sound source in proportion to increase in the distance from the sound source.

Figure 24:
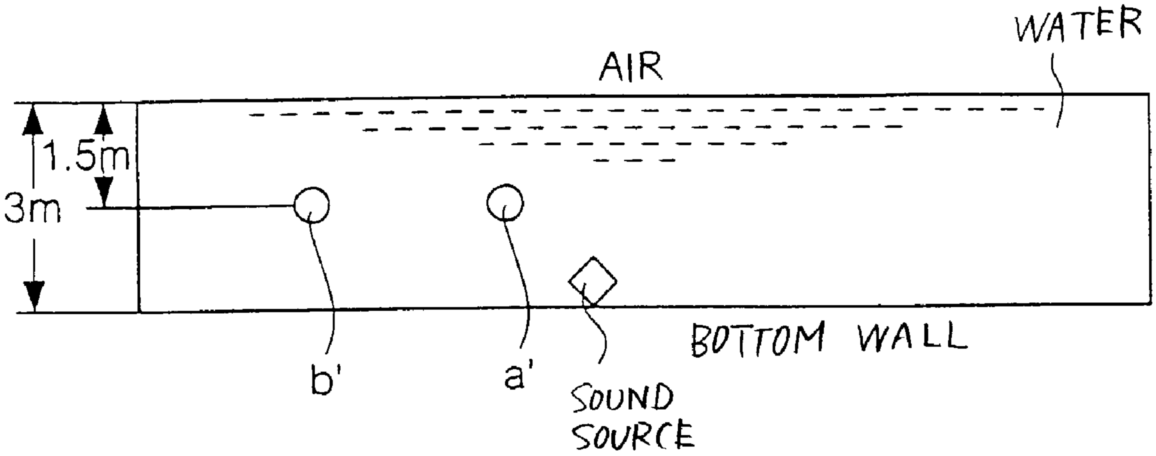
FIG. 24 is a diagram explanatory of conditions etc. under which were measured the frequency characteristic variations in the modification of FIG. 19.
Figure 25:
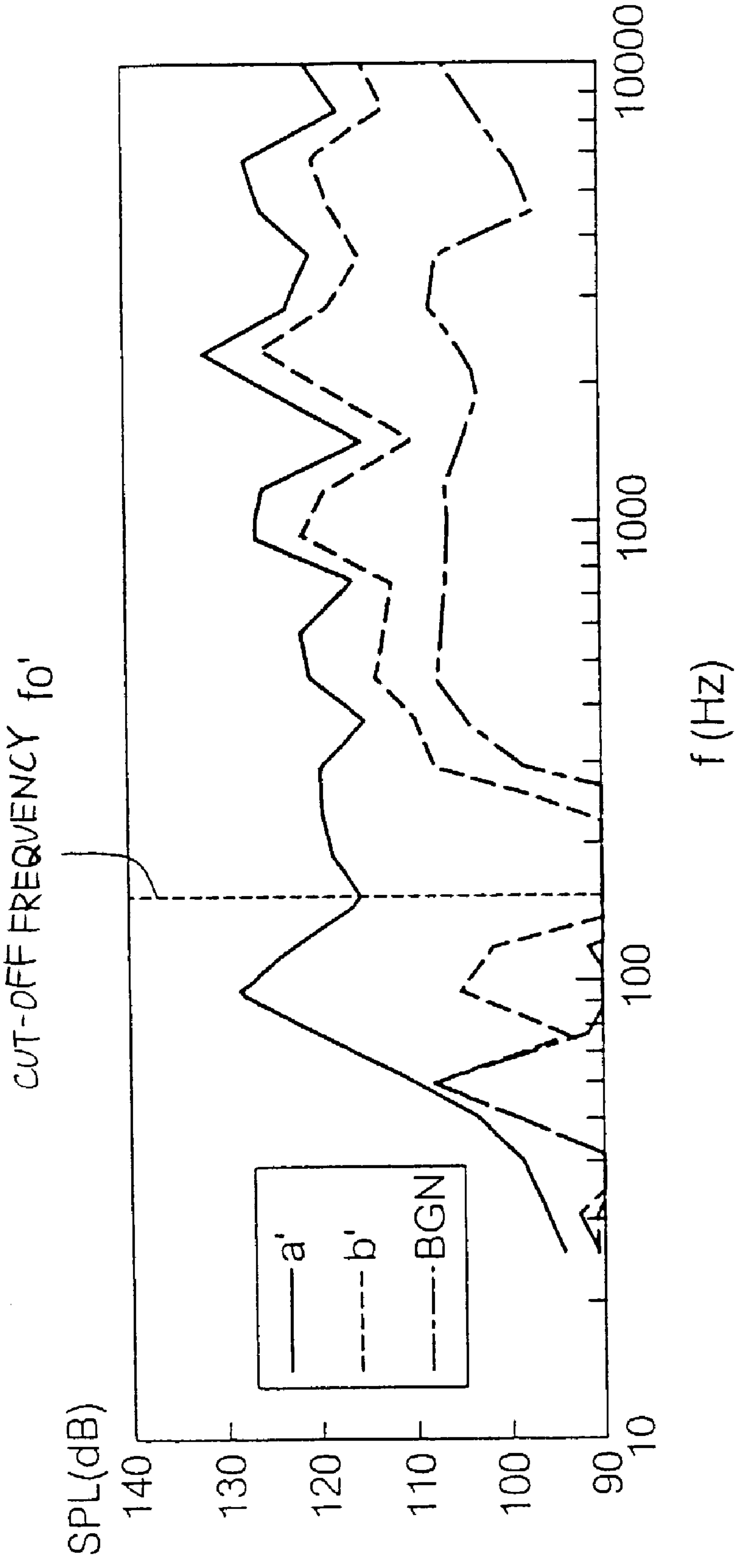
FIG. 25 is a diagram showing measured results in the modification of FIG. 19.

FIG. 24 is a diagram explanatory of conditions etc. under which the frequency characteristic variations were measured using an actual swimming pool formed, for example, of an FRP material, and FIG. 25 is a diagram showing the measured results.

As illustrated in FIG. 24, the experiment was conducted with an underwater speaker, functioning as the sound source, positioned at the bottom of the pool 1 (at a depth of three meters) and underwater microphones positioned at point "a'" and point "b'" each at a depth of 1.5 meters but apart from the underwater speaker by five meters and twenty meters, respectively.

The measurement showed that attenuation of sounds having frequencies not higher than the cut-off frequency f0 is greater at point b' remote from the sound source than at point a' close to the sound source. The measured results also showed a peak at or around 60 Hz in a variation curve of point b' shown in FIG. 25; this is perhaps due to a hum from the power-supply frequency. If attention is given to attenuation amounts (difference between point a' and point b') ignoring such frequency characteristics, similar attenuation occurs in frequencies below the cut-off frequency f0; this can confirm the simulation results.

As apparent from the results of the simulation and measurement having been described above, sound attenuation become greater in proportion to increase in the distance from the sound source. Thus, in the case where the actuators 200 are installed on the reverse surface of the predetermined actuator-installing side wall as shown, for example, in FIG. 8, there would arise problems, such as one that sounds having frequencies in the neighborhood of the cut-off frequency f0 are not propagated to a player, competitor or the like performing, swimming or making other action in an underwater position remote from the predetermined actuator-installing side wall.

Therefore, this modification avoids the above-mentioned problem that sounds having frequencies in the neighborhood of the cut-off frequency f0 are not propagated to a player, competitor or the like, by mounting the actuators 200 on the reverse surface of the bottom wall of the swimming pool 1 to thereby radiate sounds from the bottom wall upwardly toward the surface of the water.

Namely, because the distance from the upper surface of the bottom wall to the surface of the water (water depth) is normally in a range of about 1 m to 3 m, the distance from any of the actuators 200 (sound sources) installed on the bottom wall to the player, competitor or the like can fall within substantially the same range as the water depth. By thus installing the actuators 200 on the reverse surface of the bottom wall of the swimming pool 1, the distance over which sounds have to be propagated can be decreased, so that this modification can effectively avoid the problem that sounds having frequencies in the neighborhood of the cut-off frequency f0 are not propagated to a player, competitor or the like because the sound source is not far from the player, competitor or the like.

Whereas the modification has been described as installing the actuators 200 on the reverse surface of the bottom wall, rather than the side wall, of the swimming pool 1, the actuators 200 may be installed on the reverse surface of both of the side wall and bottom wall. In such a case, the actuators 200 installed on the predetermined side wall may be arranged to radiate, in the water, sounds of medium and high frequencies presenting smaller attenuation, while the actuators 200 installed on the bottom wall may be arranged to radiate, in the water, sounds of low frequencies presenting greater attenuation in accordance with increase in the distance from the sound source.

Figure 26:
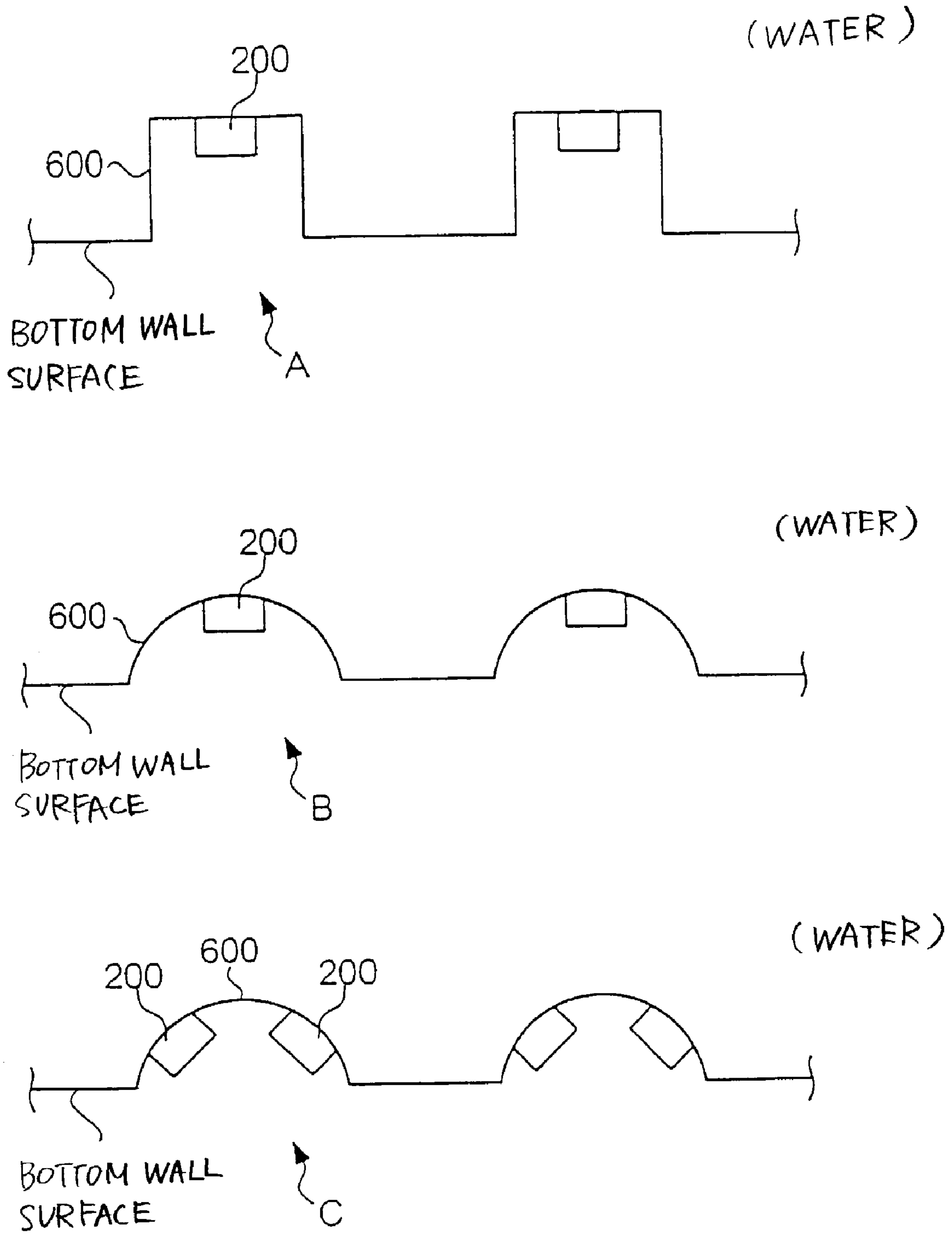
FIG. 26 is a view showing exemplary manners in which the actuators are installed on a bottom wall of the pool in accordance with the modification of FIG. 19.

Furthermore, the modification has been described as supporting the bottom wall of the swimming pool 1 on the plurality of ridges 500 formed of a rigid material like concrete and mounting the actuators 200 on the reverse or lower surface of the bottom wall of the swimming pool 1 between the ridges 500. In an alternative, a plurality of inward recessed portions 600 may be formed integrally on the bottom wall of the pool 1, as illustratively shown in FIG. 26, and one or more actuators 200 may be mounted on each of the inward recessed portions 600.

<Modification 10>

Figure 27A:
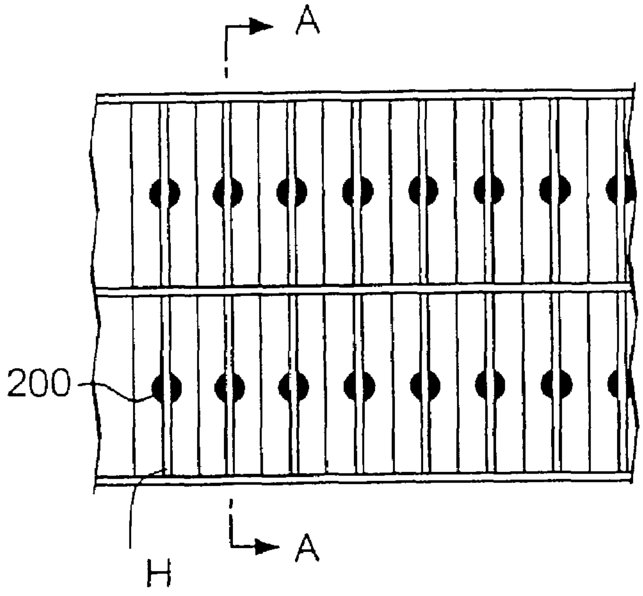
FIG. 27 is a view showing beams for tightly securing the actuators in accordance with still another modification of the present invention.
Figure 27B:
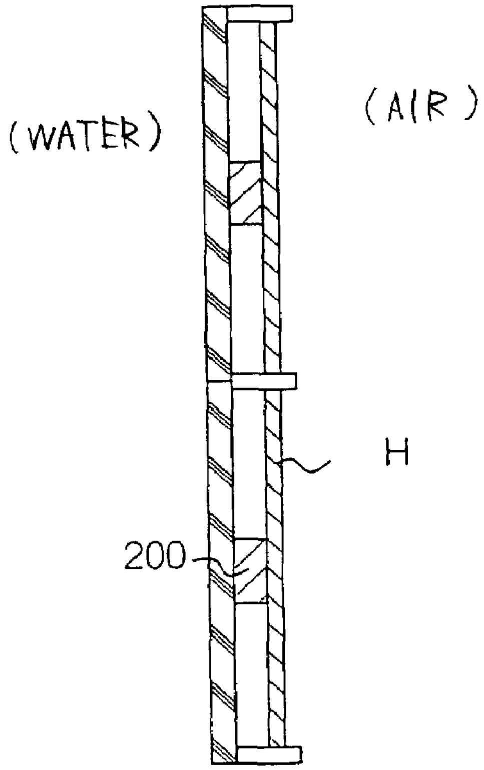

Furthermore, the embodiment has been described above in relation to the case where the actuators 200 are directly secured to the predetermined actuator-installing side wall by an adhesive or otherwise (see FIG. 5). As a modification, beams H may be provided for more tightly securing the actuators 200 to the side wall, as illustrated in FIGS. 27A and 27B.

<Modification 11>

Furthermore, whereas the embodiment has been described as applying the underwater sound radiation apparatus 100 to the swimming pool 1, the above-described underwater sound radiation apparatus 100 may be applied to large-sized and small-sized ships, submarines, etc.

Figure 28:
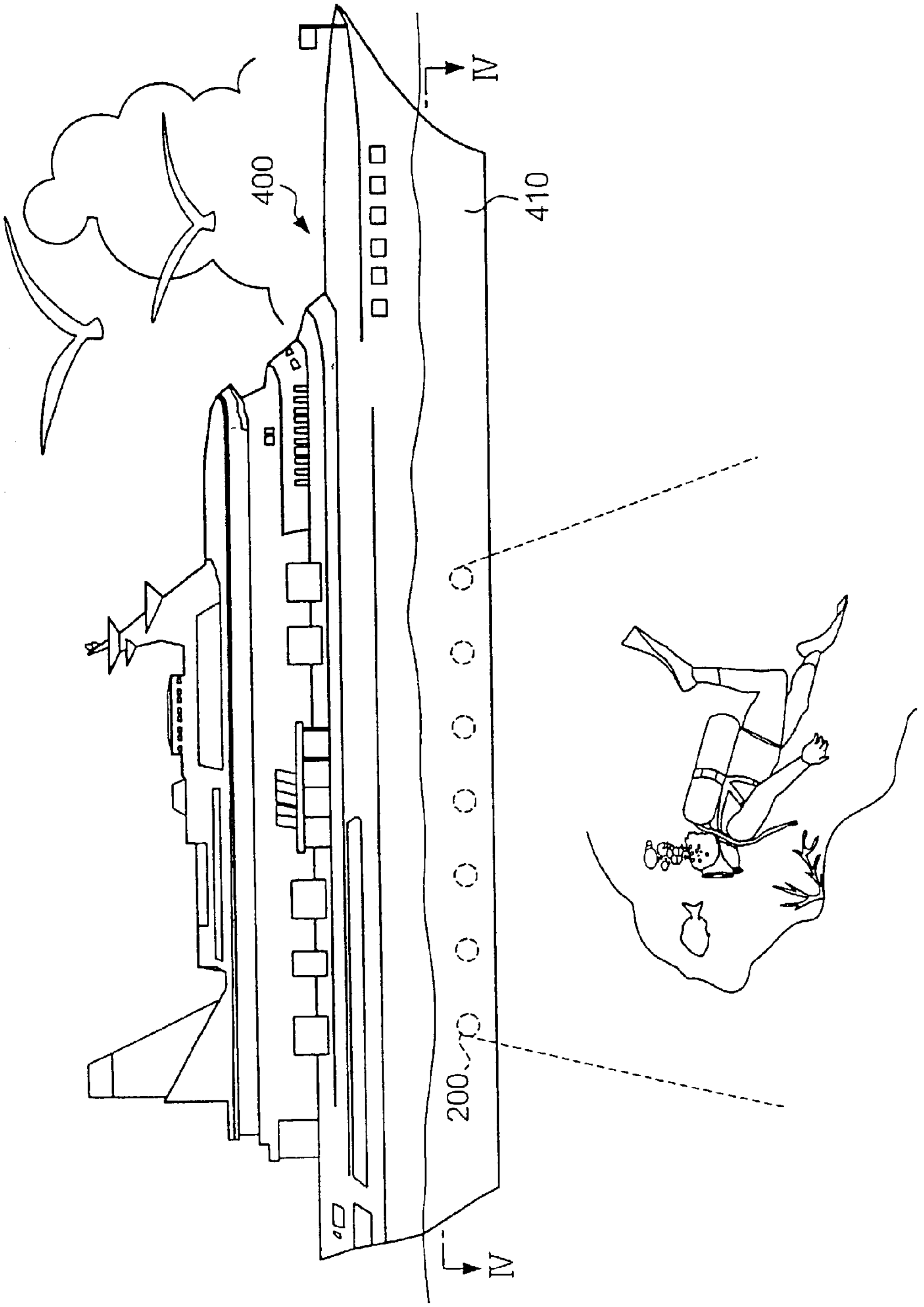
FIG. 28 is an external view of a ship to which is applied still another modification of the present invention.
Figure 29:
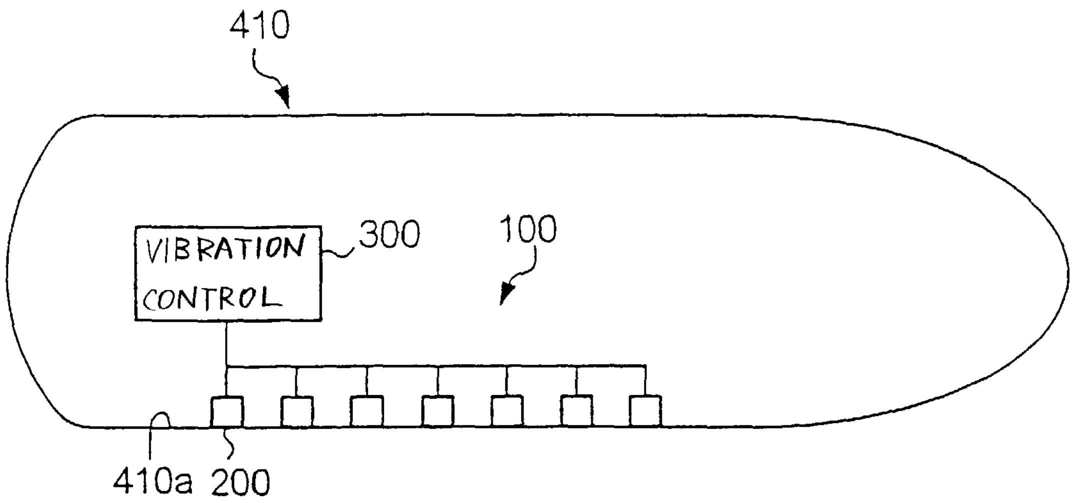
FIG. 29 is a sectional view taken along the IV—IV line of FIG. 28.
Figure 30:
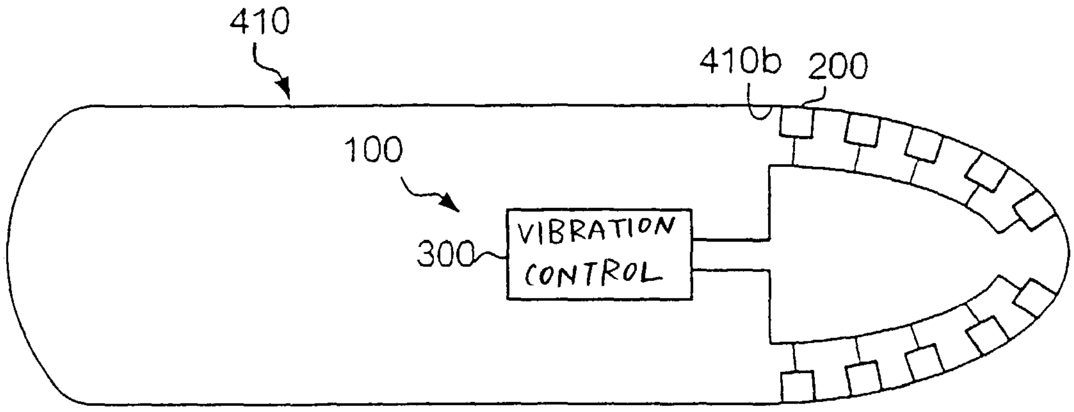
FIG. 30 is a sectional view taken along the IV—IV line of FIG. 28.
Figure 31:
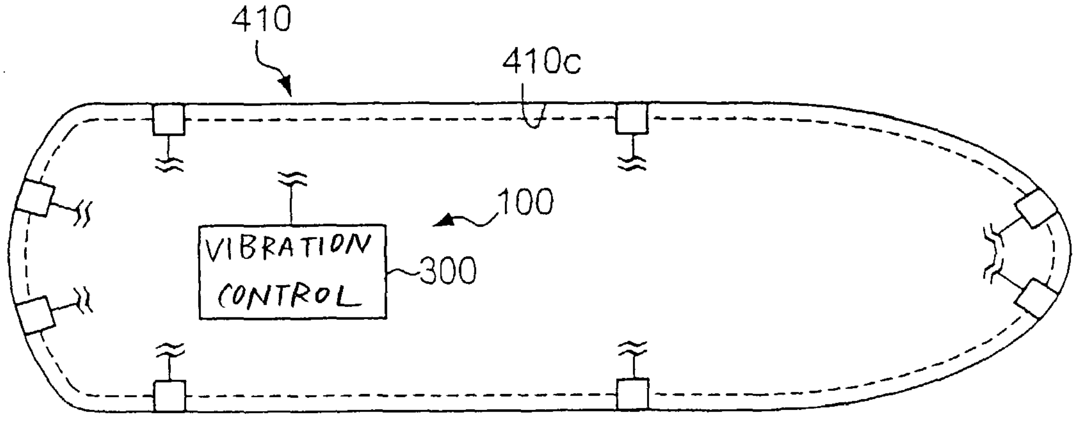
FIG. 31 is a sectional view taken along the IV—IV line of FIG. 28.
Figure 32:
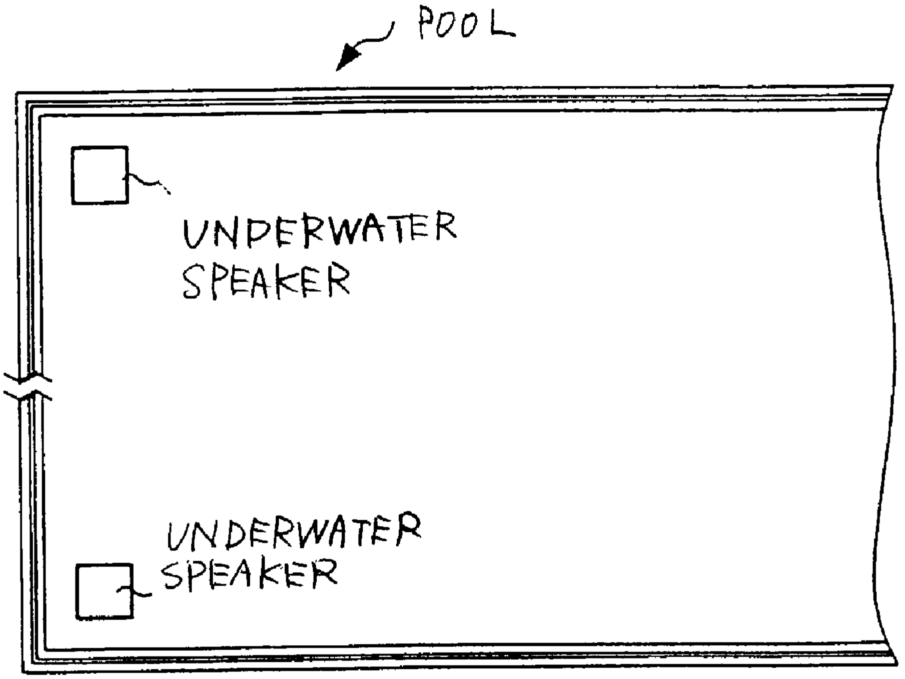
Figure 33:
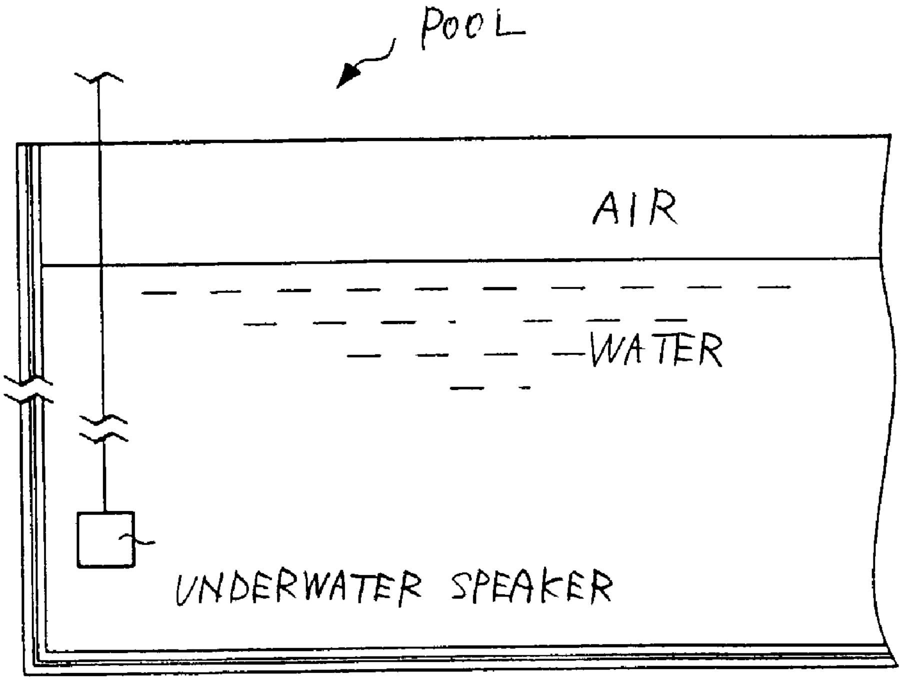
FIG. 33 is a schematic side view showing the conventional manner of installing underwater speakers shown in FIG. 32.

FIG. 28 is an external view of a ship 400 to which is applied the eleventh modification of the present invention, and FIG. 29 is a sectional view taken along the IV—IV line of FIG. 28.

Bottom section 410 of the ship 400 shown in FIG. 28 is formed of the above-mentioned FRP material or the like, and a plurality of the actuators 200 are installed on an inner flat surface 410*a* (FIG. 29) of the ship bottom section 410. The actuators 200 are each connected to the vibration control device 300 via a cable or the like.

The captain who directs the navigation of the ship 400, or other person, uses a microphone (not shown) to give instructions to a diver conducting sea bottom investigations under water. Once the vibration control device 300 receives a voice signal etc. corresponding to the instructions via the microphone, the control device 300 performs an equalizing process, level adjusting process, etc. on the voice signal and then the resultant amplified electric signal to the actuators 200 installed at predetermined intervals on the inner flat surface 410*a* of the ship bottom section 410. The actuators 200 converts the received electric signal into a mechanical vibration signal to vibrate the flat surface 410*a*, so that the voices corresponding to the instructions can be radiated. When the diver, conducting the sea bottom investigations under water, hears the voices radiated from the flat surface 410*a*, he or she can, for example, change the area of the investigations on the basis of the instructing voices.

While the plurality of actuators 200 can be installed at predetermined intervals on the inner flat surface 410*a* of the ship bottom section 410, they may also be installed at predetermined intervals on an inner curved surface 410*b* or entire inner surface 410*c* of the ship bottom section 410. In the case where the plurality of actuators 200 are installed at predetermined intervals on the entire inner surface 410*c* of the ship bottom section 410, sounds of background music or voices can be radiated in all directions about the ship 400. It should be appreciated that any desired one or more of the above-described other modifications may be applied to this eleventh modification.

In summary, the present invention arranged in the above-described manner can reproduce sounds of wide frequency bands.

What is claimed is:

1. An underwater sound radiation apparatus for radiating a human-audible sound in a body of water, which comprises:

a vibratable wall formed with an inner surface thereof that stores and contacts the water therein;

a plurality of vibrating sections that are provided on the inner surface or an outer surface of said wall and convert an input electric signal into a mechanical vibration signal to vibrate said wall; and a vibration control section that supplies each of said vibrating sections with said input electric signal to vibrate said wall which radiates vibration in the water, said vibration propagating in the water and being received by a human in the water via bone conduction corresponding to the human-audible sound.

2. An underwater sound radiation apparatus as claimed in claim 1, wherein said wall is formed of a thin plate of a light and rigid material.

3. An underwater sound radiation apparatus as claimed in claim 1, wherein the vibrating sections are driven synchronously in phase.

4. An underwater sound radiation apparatus as claimed in claim 1, wherein said plurality of vibrating sections are arranged to substantially cover the entire inner surface or the entire outer surface of said wall.

5. An underwater sound radiation apparatus for provision on a water tank having a plurality of walls to radiate a human-audible sound in water stored in said water tank, which comprises:

a plurality of vibrating sections that are provided on a particular one of said walls and convert an input electric signal into a mechanical vibration signal to vibrate the particular one wall;

means for securing said plurality of vibrating sections onto a surface of said particular one of said walls so as to vibrate said particular one of said walls; and a vibration control section that supplies each of said vibrating sections with said input electric signal to vibrate said particular one of said walls which radiates vibration in the water, said vibration propagating in the water and being received by a human in the water via bone conduction corresponding to the human-audible sound, wherein the particular one wall is formed of a thin plate of a light and rigid material.

6. An underwater sound radiation apparatus as claimed in claim 5, wherein said water tank is a swimming pool, a water tank containing underwater plants or aquarium fish, a storage tank, a bathtub, a fish pond, or containers for brewing of alcoholic drinks, soy sauce, or soy bean paste.

7. An underwater sound radiation apparatus as claimed in claim 6, wherein said plurality of vibrating sections are provided on an outer surface, facing an exterior of said water tank, of the particular one wall.

8. An underwater sound radiation apparatus as claimed in claim 6, wherein said plurality of vibrating sections are provided at predetermined intervals on an outer surface, facing an exterior of said water tank, of the particular one wall, and said vibration control section supplies the electric signal to each of said vibrating sections in a synchronized fashion.

9. An underwater sound radiation apparatus as claimed in claim 8, wherein the particular one wall is a side wall of said water tank, and said plurality of vibrating sections are provided on the outer surface of the side wall in a staggered layout.

10. An underwater sound radiation apparatus as claimed in claim 6, wherein said particular one of said walls is a bottom wall of said water tank.

11. An underwater sound radiation apparatus as claimed in claim 5, wherein the vibrating sections are driven synchronously in phase.

12. An underwater sound radiation apparatus as claimed in claim 5, said plurality of vibrating sections are arranged to substantially cover the entire inner surface or the entire outer surface of said wall.

13. An underwater sound radiation apparatus as claimed in claim 5, wherein the particular one wall includes wall members connected to each other by connecting means to provide a flat vibrating surface area.

14. An underwater sound radiation apparatus for provision on a ship to radiate a human-audible sound from said ship into water outside of said ship, which comprises:

at least one vibrating section that is provided on a bottom portion of said ship and converts an input electric signal into a mechanical vibration signal to vibrate the bottom portion;

means for securing said at least one vibrating section onto a bottom surface of said bottom portion so as to vibrate the bottom portion; and a vibration control section that supplies said vibrating section with an electric signal corresponding to the human-audible sound to be radiated in the water, wherein the bottom surface of said ship includes a curved surface portion, and said at least one vibrating section is provided on the curved surface portion, and said at least one vibrating section is provided on the curved surface portion at predetermined intervals, and said vibration control section supplies the electric signal to each of said at least one vibrating section in a synchronized fashion.

15. A method for radiating a human-audible sound in water stored in a water tank, comprising:

providing an underwater sound radiation apparatus having a plurality of vibrating sections that convert an input electric signal into a mechanical vibration signal to vibrate a wall of the water tank the apparatus secured onto, and a vibration control section that supplies each of said vibrating sections with said input electric signal;

securing said plurality of vibrating sections onto said wall of the water tank, said wall being formed of a thin plate of a light and rigid material; and vibrating said wall to radiate vibration in the water by activating said plurality of vibrating sections of said underwater sound radiation apparatus, said vibration propagating in the water and being received by a human in the water via bone conduction corresponding to the human-audible sound.

* * * * *